United States Patent [19]

Kadowaki et al.

[11] Patent Number: 4,963,898
[45] Date of Patent: Oct. 16, 1990

[54] METHOD AND APPARATUS FOR FORMING A COLOR IMAGE

[75] Inventors: Toshihiro Kadowaki; Masanori Sakai, both of Yokohama, Japan

[73] Assignee: Canon Kabushiki Kaisha, Tokyo, Japan

[21] Appl. No.: 436,800

[22] Filed: Nov. 15, 1989

Related U.S. Application Data

[63] Continuation of Ser. No. 299,064, Jan. 19, 1989, abandoned.

[30] Foreign Application Priority Data

| Jan. 19, 1988 | [JP] | Japan | 63-10135 |
| Jan. 19, 1988 | [JP] | Japan | 63-10136 |
| Jan. 19, 1988 | [JP] | Japan | 63-10140 |
| Jan. 19, 1988 | [JP] | Japan | 63-10142 |

[51] Int. Cl.$^5$ ............................ G01D 15/00
[52] U.S. Cl. ................................. 346/157
[58] Field of Search ............. 346/154, 157, 107 R, 346/108, 160; 368/518, 519; 358/298, 300

[56] References Cited

U.S. PATENT DOCUMENTS

4,368,491  1/1983  Saito ........................ 358/298
4,587,536  6/1986  Saito ........................ 346/157

Primary Examiner—Donald A. Griffin
Attorney, Agent, or Firm—Fitzpatrick, Cella, Harper & Scinto

[57] ABSTRACT

There is disclosed an apparatus comprising: an input circuit for inputting at least one of the coded character informaton, coded figure information, and bit image information; a memory to store an image; an image developing circuit for developing the information input by the input circuit into the image memory with respect to one output color component; and an image forming circuit to form one output color component image in accordance with the value of the image data in the memory, wherein a color image can be formed by repeating the image development and the image formation with respect to a plurality of output color components.

34 Claims, 26 Drawing Sheets

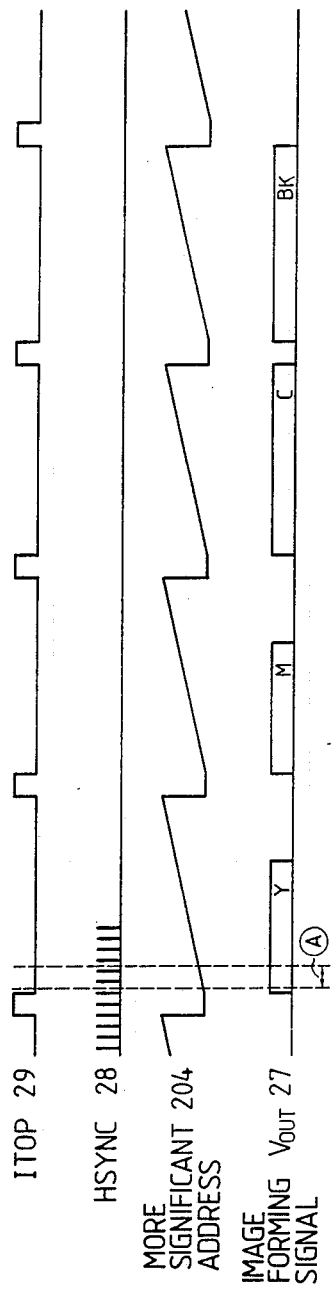
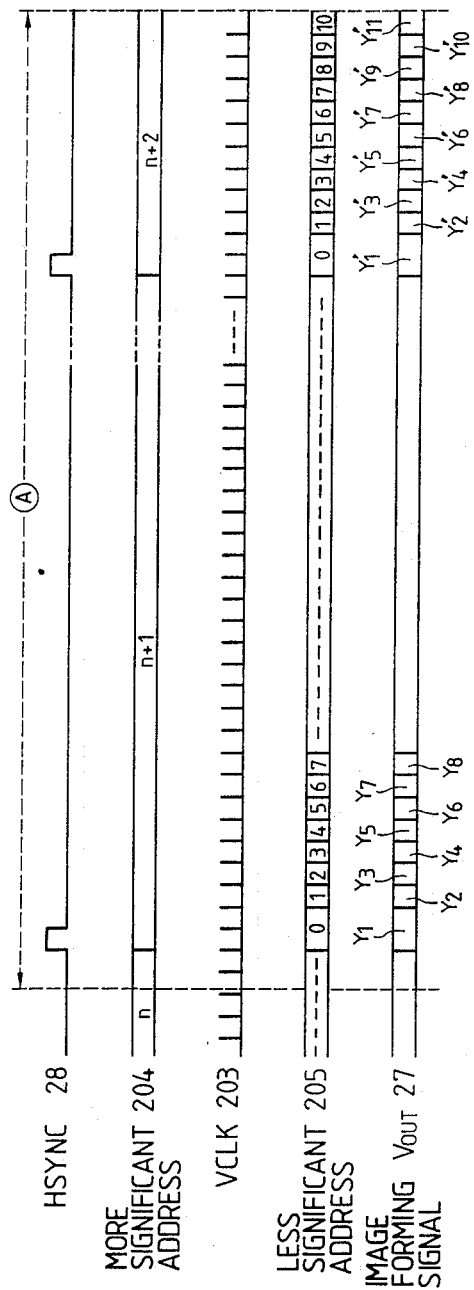
FIG. 4A
FIG. 4B

FIG. 5A
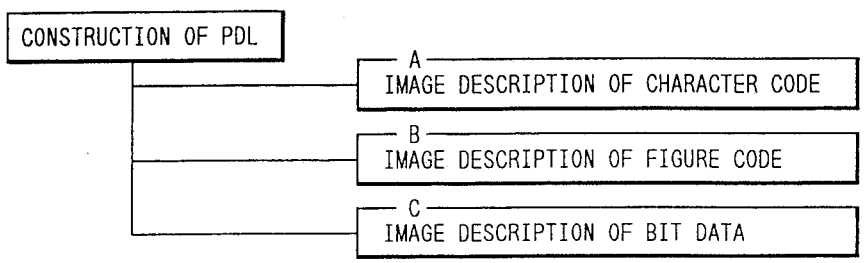
FIG. 5B
```
CHAR COLOR (0.0, 0.0, 0.0) ;           ——— ℓ5b - 1
STRING ="IC"                            ——— ℓ5b - 2
PUT CHAR ( 0.0, 0.0, 0.3, 0.1, STRING) ——— ℓ5b - 3
```
FIG. 5C
```
LINE COLOR (1.0, 0.0, 0.0) ;     ——————— ℓ5c - 1
PUT LINE (0.0, 0.4, 1.0, 0.4) ;  ——————— ℓ5c - 2
```
FIG. 5D
```
BIT COLOR (1.0, 1.0, 0.5) ;          ——— ℓ5d - 1
BIT DATA = < 0 ,0 ,1 ,0 ,0           ——— ℓ5d - 2
             0 ,1 ,1 ,1 ,0           ——— ℓ5d - 3
             1 ,1 ,1 ,1 ,1           ——— ℓ5d - 4
             0 ,1 ,1 ,1 ,0           ——— ℓ5d - 5
             0 ,0 ,1 ,0 ,0 ,> ;      ——— ℓ5d - 6
PUT BIT (0.1, 0.5, 5.5, BIT DATA) ;  ——— ℓ5d - 7
```
FIG. 5E
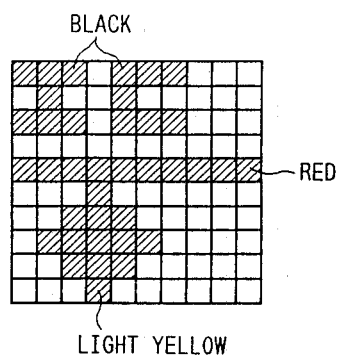

| FIG. 6B-1 | FIG. 6B-2 |

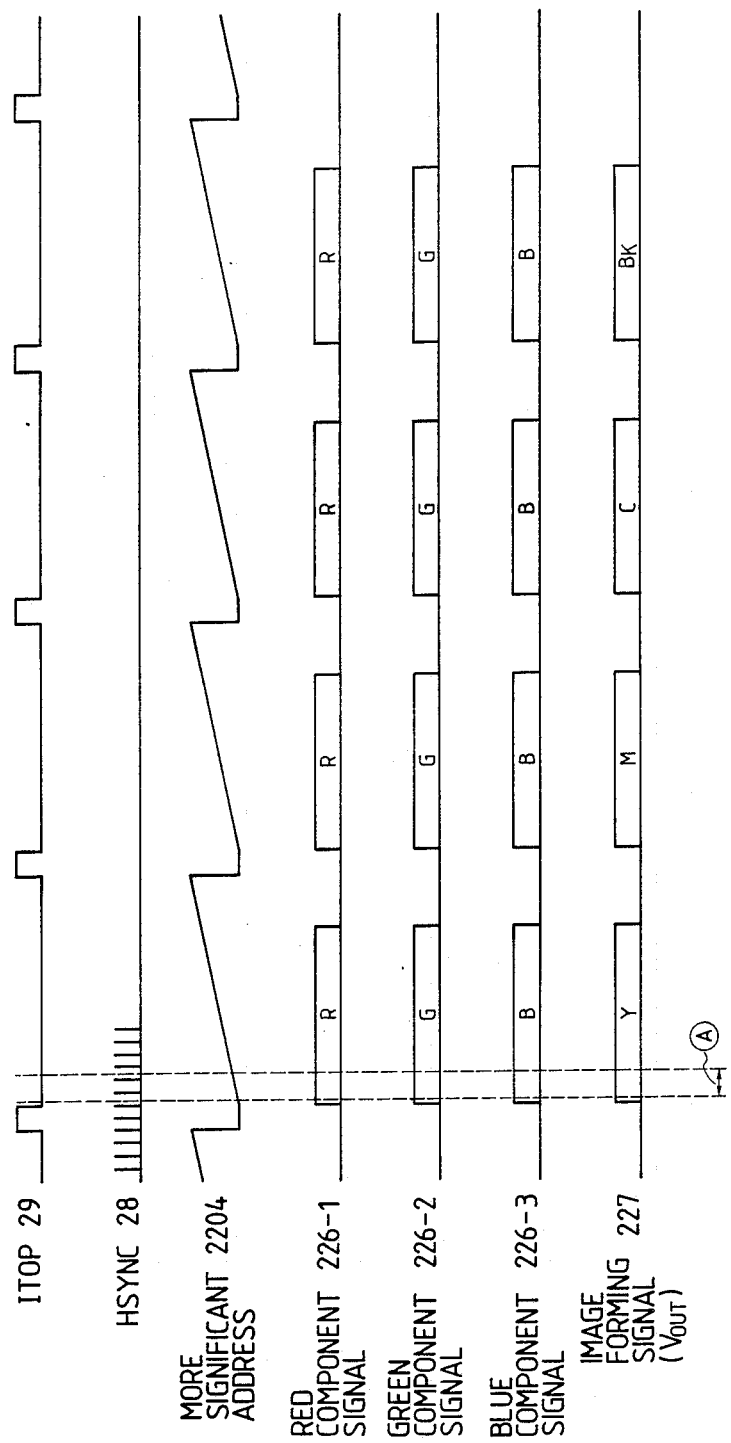

| FIG. 12B-1 | FIG. 12B-2 |

FIG. 14

| INPUT PALETTE DATA 26 | R COMPONENT DATA 32-1 | G COMPONENT DATA 32-2 | B COMPONENT DATA 32-3 | NOTE |
|---|---|---|---|---|
| 0 | 255 | 255 | 255 | WHITE |
| 1 | 255 | 255 | 0 | YELLOW |
| 2 | 255 | 0 | 255 | MAGENTA |
| 3 | 0 | 255 | 255 | CYAN |
| 4 | 255 | 0 | 0 | RED |
| 5 | 0 | 255 | 0 | GREEN |
| 6 | 0 | 0 | 255 | BLUE |
| 7 | 0 | 0 | 0 | BLACK |
| 8 | 255 | 255 | 125 | LIGHT BLUE |
| ---- | | | | |
| 255 | 85 | 0 | 0 | DARK RED |

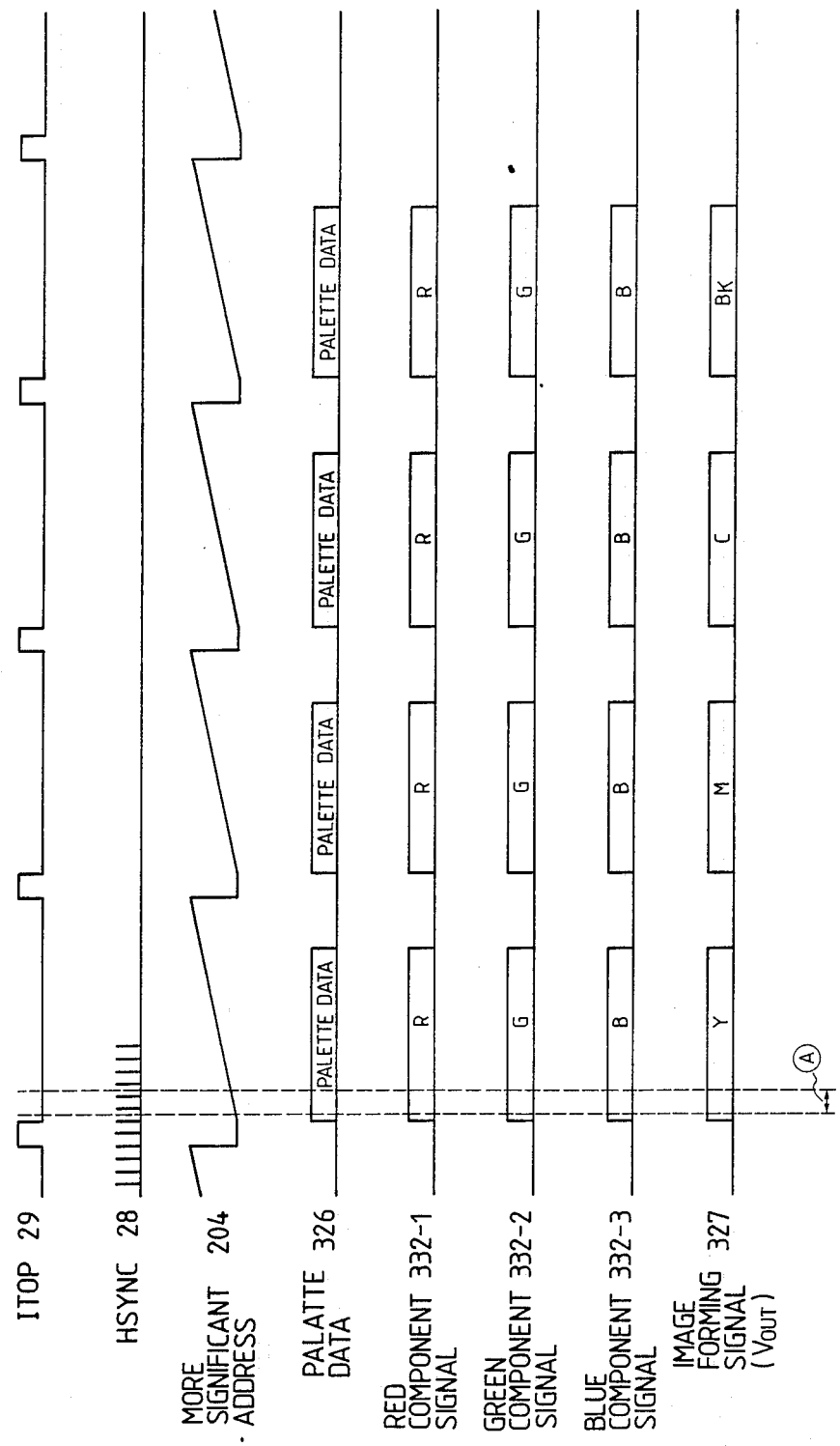

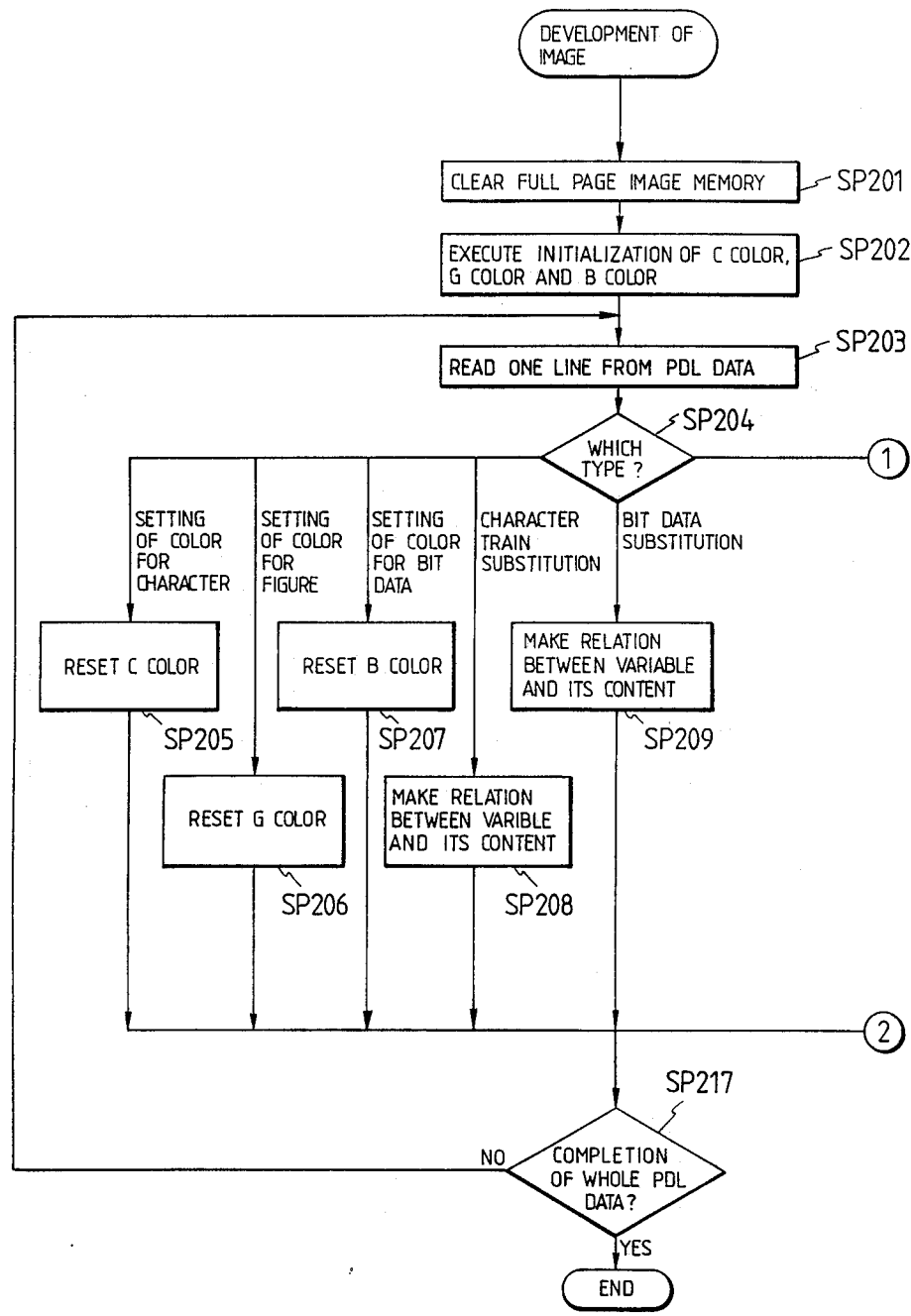

METHOD AND APPARATUS FOR FORMING A COLOR IMAGE

This application is a continuation of application Ser. No. 299,064, filed Jan. 19, 1989, now abandoned.

BACKGROUND OF THE INVENTION

1. Field of the Invention

The present invention relates to a color image forming apparatus and, more particularly, to an apparatus for receiving at least one of the coded character information, coded figure information, and bit image information from a host apparatus and forming a color image.

2. Related Background Art

Hitherto, a color graphic display has mainly been used as an apparatus for receiving PDL (Page Description Language) data including color information as input data and forming an image on the basis of the input data. The PDL is a language to describe output data of a page layout software system and describes an objective image by combining an image description of character code, an image description of figure code, and an image description of bit data which are handled by the page layout software as shown in FIG. 5A. The graphic display which receives the PDL data as input data generally has three bit map memories, for red (R), green (G), and blue (B). The image data are respectively indicated by the image description of character code, image description of figure code, and image description of bit data are developed in the respective bit map memories in accordance with the color information in the PDL data and displayed. Further, in many cases, a color image which is used in a computer is ordinarily dissolved into three color components of R, G, and B and provided. Therefore, the PDL including the color information generally handles the color information as three color components of R, G, and B.

However, in ordinary color printers, an image is formed by the primary color components, for instance, cyan, magenta, and yellow of the subtractive color mixing system which mixes color materials, as red, green, and blue as the primary color components of the additive color mixing system which are used in the color graphic display (for instance, CRT) cannot be used and must be converted.

Further, if an image forming method for use in the above display is applied to a color printer of a high resolution and multi-gradations, the memory capacity increases greatly because of the following two reasons.

1) In the case of the display, it is sufficient to provide three bit map memories for R, G, and B. However, to obtain a high quality image such as a beautiful black character or the like by the color printer, the black component is necessary in addition to the color components of cyan, magenta, and yellow. Further, to obtain a high gradation image, data of six to eight bits must be provided for each color component, so that the memory capacity which is necessary for every pixel increases.

2) The resolution of the high resolution printer is set to 400 dpi (dots per inch) and the number of pixels constructing an image is larger than that in the case of the graphic display whose resolution is about 70 dpi.

Therefore, in the color printer in which, for instance, the resolution is set to 400 dpi, four color materials of yellow, magenta, cyan, and black are used, and the data regarding each color component consists of eight bits, a memory having the memory capacity of about 64 Mbytes is needed to construct the bit map memory of the A4 size. The necessity of such a large amount of memory results in one problem in development of a color image forming apparatus (for instance, color printer) which receives the PDL data as input data.

On the other hand, nothing has been proposed yet with respect to a point that the PDL data for the graphic display is applied to the color printer which forms an image by color components other than R, G, and B. If such PDL data is simply applied to the color printer, the following drawbacks occur.

Since the positions in color space of the color components differ in accordance with the color materials in dependence on the color printer, when the input color component data of R, G, and B are inverted and the component data of C, M, and Y as the complementary colors are merely formed, the correct color is not formed.

SUMMARY OF THE INVENTION

It is the first object of the present invention to enable an image forming apparatus to be constructed by a smaller memory capacity in consideration of the foregoing points.

Another object of the invention is to provide a color image processing apparatus having a smaller required memory capacity.

Still another object of the invention is to provide a color image forming apparatus which can preferably and highly accurately form a color image.

Under such objects, according to a preferred embodiment of the invention, there is disclosed a color image forming apparatus comprising:

input means for inputting at least one of coded character information, coded figure information, and bit image information;

image memory means;

image developing means for developing the information which is input by the input means into the image memory means with respect to one output component; and image forming means for forming one output color component image in accordance with a value of image data in the memory means, wherein a color image is formed by repeating the image development and image formation with respect to a plurality of output color components.

In addition to the above objects, still another object of the invention is to provide a color image forming apparatus which can form a color image at a high speed.

Under such an object, according to preferred embodiment of the invention, there is disclosed an image forming apparatus comprising:

input means for inputting at least one of coded character information, coded figure information, and bit image information;

a plurality of image memory means corresponding to color components of the character information, figure information, and bit image information which are input;

image developing means for developing an image indicated by such information into the corresponding image memory means with respect to each of the input color components;

processing means for image processing each of the input color component data in the plurality of image memory means and for calculating a plurality of color component data; and image forming means for forming each of output color component images in accordance with the value of each of the output color component data.

The above and other objects, features and advantages of the present invention will become more fully apparent from the following detailed description of the preferred embodiment--; and the appended claims with reference to the accompanying drawings.

BRIEF DESCRIPTION OF THE DRAWINGS

FIGS. 4A and 4B are timing charts for an image signal and a control signal;

FIGS. 5A to 5E are diagrams for explaining a PDL;

FIGS. 11A and 11B are timing charts for an image signal and other signals;

FIG. 14 is a diagram for explaining the functions of a pallet data conversion circuit;

FIGS. 15A and 15B are timing charts for an image signal and other signals; and

DETAILED DESCRIPTION OF THE PREFERRED EMBODIMENTS

According to the first embodiment of the present invention which will be explained hereinbelow, there is disclosed a color image forming apparatus which has only one bit map memory and in which the capacity of the necessary bit map memory is reduced by repeating ①the development of the portion regarding the color component of PDL data into the bit map memory and ②the formation of the color component image using the data in the bit map memory for every image formation of each of the color components.

The above embodiment will now be described in detail hereinbelow with reference to the accompanying drawings. Embodiment 1

Figure 1:
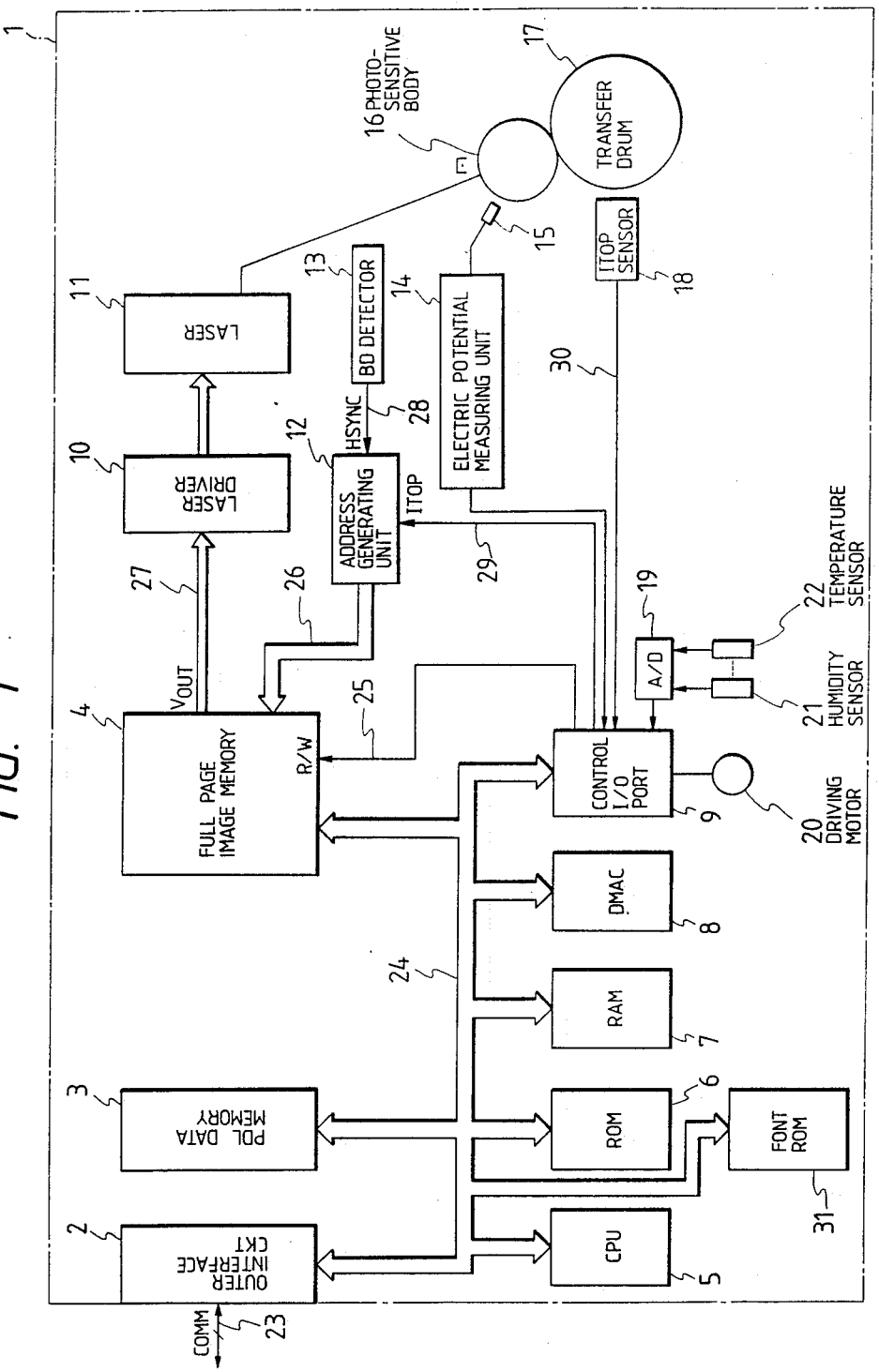
FIG. 1 is a block diagram of a color printer of the first embodiment according to the present invention.

FIG. 1 is a block diagram of a color printer of the embodiment. Reference numeral 23 denotes a general digital interface such as GPIB interface, centronics interface, or the like; 2 indicates its interface circuit; 24 a CPU (Central Processing Unit) bus including an address bus and a data bus. A CPU 5, an ROM (Read Only Memory) 6, an RAM (Random Access Memory) 7, a DMAC (Direct Memory Access Controller) 8, an I/O port 9 for control, a font ROM 31, a PDL data memory 3, and a full page image memory 4 are connected to the CPU bus 24, thereby enabling the data transfer among them and the control by the CPU 5 to be performed. The ROM 6 stores programs for the CPU 5. The RAM 7 is the working RAM for the CPU 5. The CPU 5 communicates with an external host apparatus through the outer interface circuit 2 and receives and transmits various kinds of commands, status, and image data. When a transfer command of the PDL data among various commands is received, the CPU 5 makes the DMAC 8 operative, thereby allowing the PDL data which is thereafter sent through the outer interface circuit 2 to be DMA (Direct Memory Access) transferred into the PDL data memory 3. The DMA transfer is a data transfer method which is used in the ordinary microcomputer system. After all of the PDL data are completely transferred, the CPU 5 first clears the full page image memory 4. The clearing operation of the memory in this case denotes that a value such as not to form an image when an image is formed, which will be explained hereinlater, is written into the memory. In the case of the embodiment, the value "0" is written by the CPU 5. However, such a value can be also written by hardware like a simple circuit consisting of a clock generator and a counter.

The CPU 5 then interprets the PDL data held in the PDL data memory and develops the image indicated by the PDL data into the full page image memory with respect to one output color component. The developing method in this case will be described in detail hereinafter. The memory 4 has the capacity regarding at least one color in the color image of one original and both of the write/read accesses of data by the CPU bus and the read access by an address which is generated from an address generating unit 12 can be executed. These accessing operations are switched by a control signal 25 from the control I/O port 9. The foregoing image development is performed by switching the accessing mode to the access side by the CPU bus. After the development into the full page image memory with respect to one output color component, the CPU 5 switches the accessing mode to the memory 4 to the side of the address generating unit. The color component image data read out of the memory 4 on the basis of the address generated from the address generating unit is input to a laser driver 10. By driving a laser 11, an image is formed.

The CPU 5 repeats the processes such as image development about one output color component and formation of the output color component image by the developed output color component image data with respect to each of the output color components of yellow, magenta, cyan, and black, thereby forming a full color image.

In addition to the communication with the outer apparatus, the CPU 5 controls each of the control elements of a color printer 1 through the control I/0 port. Reference numeral 15 denotes a potential sensor to detect the charges charged on a photo-sensing body 16 and 14 indicates an electric potential measuring unit for converting an analog output signal from the sensor 15 into a digital signal and inputting to the control I/O port 9. The potential data input to the I/O port 9 is read by the CPU 5 and used for control. A driving motor 20 is used to drive each of the driving elements such as a transfer drum and the like of the color printer.

On the other hand, a signal 30 from an image edge detecting sensor 18 is input to the I/O port 9 and read by the CPU 5 and used to make a vertical sync signal (ITOP) 29 which is given to the address generating unit 12.

A signal 28 from a BD (beam detector) 13 is given as a horizontal sync signal (HSYNC) to the address generating unit 12.

On the other hand, outputs of a humidity sensor 21 and a temperature sensor 22 to correct the developing characteristic are input to the I/O port 9 through an A/D converting unit 19.

Figure 2:
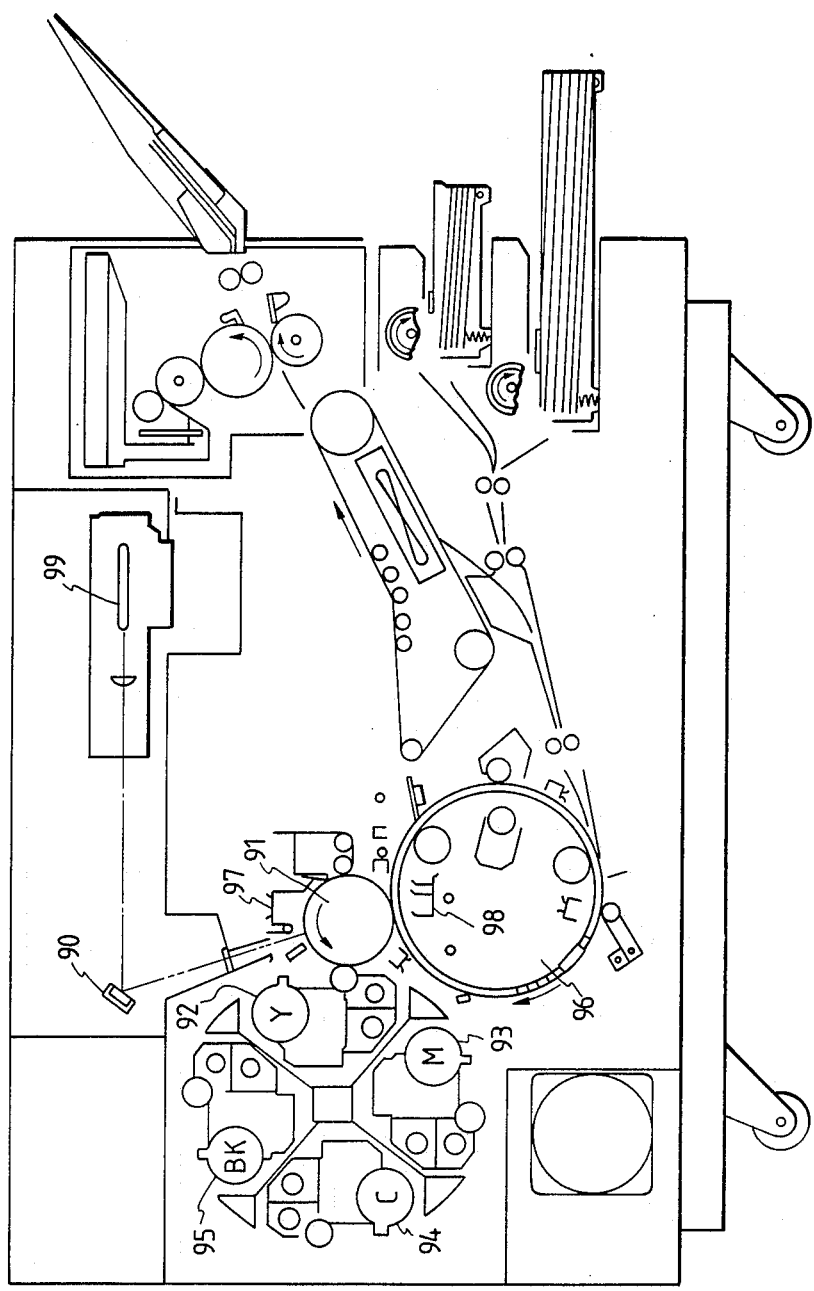
FIG. 2 is a constructional view of the color printer to which the invention is embodied.

FIG. 2 is a constructional view of a color printer 10 according to this embodiment. For every image formation of four times, each of the output color component images of yellow, magenta, cyan, and black developed in the memory 4 is subjected to a PWM process and the like by the laser driver 10 and the laser 11 is finally driven.

The laser beam modulated in accordance with the image data scans at a high speed by a polygon mirror 99 which rotates at a high speed and is reflected to a mirror 90, thereby exposing a dot corresponding to an image onto the surface of a photosensitive drum 91. One horizontal scan of the laser beam corresponds to one horizontal scan of the image and is set to a width of 1/16 mm in this embodiment. On the other hand, since the drum 91 is rotating at a constant velocity in the direction of the arrow, a planar image is sequentially exposed by the laser beam scan in the main scanning direction and by the constant-velocity rotation of the drum 91 in the subscanning direction. Prior to exposure, the drum 91 is uniformly charged by a charging device 97. A latent image is formed when the charged photosensitive body is exposed. The latent image by a predetermined chrominance signal is developed by developing devices 92 to 95 each corresponding to a predetermined color.

For instance, when considering the first image formation in which a yellow color component is output from the memory 4, a dot image of the yellow component of an original is first exposed on the drum 91 and developed by the yellow developing device 92.

Next, for the yellow image, the yellow toner image is transferred and formed by a transfer charging device 98 onto a paper wound around a transfer drum 96 at a contact between the photosensitive drum 91 and the transfer drum 96. By the same processes as mentioned above, in the second to fourth image formation, toner images of magenta, cyan, and black are repetitively transferred and formed in accordance with the magenta, cyan, and black component signals which are output from the memory 4, respectively. By overlaying the respective images onto the paper, a color image is formed by four color toners.

Figure 3:
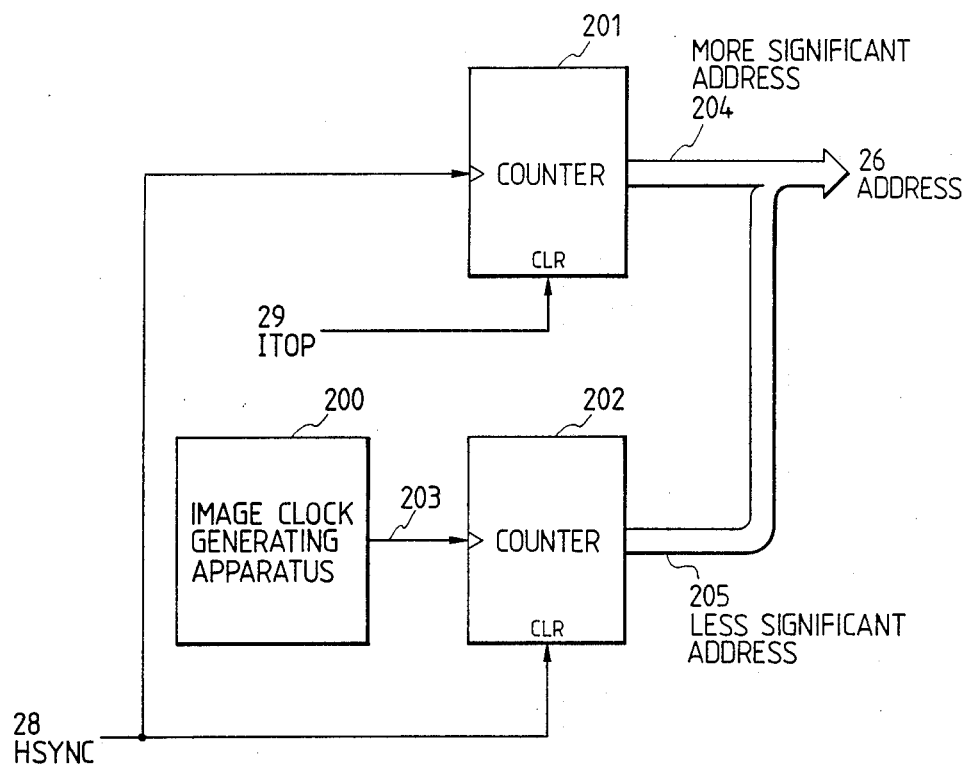
FIG. 3 is a block diagram of an address generating unit.

FIG. 3 is a diagram for explaining a method of realizing the address generating unit 12 in FIG. 1 according to the embodiment. Reference numeral 200 denotes an image clock generating apparatus for generating carrier clocks of an image. A counter 202 is cleared by the horizontal sync signal (HSYNC) 28 and generates an address 205 in the horizontal direction by counting carrier clocks 203. On the other hand, a counter 201 is cleared by the vertical sync signal (ITOP) 29 and generates an address 204 in the vertical direction by counting the horizontal sync signal (HSYNC). The horizontal address is used as a less significant address and the vertical address is used as a more significant address and an address 26 in the full page image memory is constructed. In the case of using the full page image memory in such an address construction, even when an image is developed into the full page image memory by the CPU prior to using such a memory, the image development must be executed in accordance with the address assignment. For instance, the image data at a point in which the address in the horizontal direction is X and the address in the vertical direction is Y must be written into the address in which the more significant address is Y and the less significant address is X in the full page image memory.

FIG. 4A is a timing chart for the vertical sync signal (ITOP) 29 and horizontal sync signal (HSYNC) 28 which are input to the address generating unit when the image formation of four times is executed, the more significant address 204 in the full page image memory 4 which is generated from the address generating unit, and the content of the full page image memory which is read out as an image forming signal ($V_{out}$) 27. As shown in the diagram, subsequent to each of the vertical sync signals, the yellow (Y) component data, magenta (M) component data, cyan (C) component data, and black (BK) component data are read out and sent to the laser driver 10. In the diagram, the more significant address has been illustrated so as to be continuously changed so as to be easily seen. However, since it is actually the output value of the counter which receives the HSYNC signal, it has a stairway-like shape synchronized with the HSYNC.

FIG. 4B is a timing chart for each signal in an interval (A) in FIG. 4A. The timing chart relates to the interval from one horizontal sync signal (HSYNC) 28 to the next horizontal sync signal and shows the timing for each signal in one horizontal interval. The more significant address 204 is counted up one by one every HSYNC. The less significant address 205 is set to 0 by the HSYNC and is counted up one by one by the image carrier clock 203. The data in the address designated by the less significant address 205 and more significant address 204 in the full page image memory 4 is read out and is output as the image forming signal $V_{out}$ 27. Therefore, in FIG. 4B, $Y_1$ to $Y_8$ denote data in the addresses of the more significant address n+1 and less significant addresses 0 to 7 and $Y_1'$ to $Y_8'$ indicate data in the addresses of the more significant address n+2 and less significant addresses 0 to 7, respectively. That is, $Y_1'$ to $Y_8'$ represent the image data at the positions which are deviated by only one address in the vertical direction for the data $Y_1$ to $Y_8$, respectively.

FIGS. 5A through 5E are diagrams for explaining the PDL (Page Description Language). As shown in FIG. 5A, the PDL is a general denomination of the language to describe one or more images by combining the image description of character code, image description of figure code, and image description of bit data. As the PDLs which are nowadays the main stream, the PostScript (Adobe Systems), DDL (Imagen Hewlett Packard), and Interpress (XEROX) have been known.

In this description of the embodiment, the simple PDL shown in FIGS. 5B to 5D is used.

FIG. 5B shows an example of the image description of character code. First, in 15b-1, an instruction is made to perform the subsequent character description by the color such that all of the luminance data of red (R), green (G), and blue (B) are 0, that is, by black. Next, in 15b-2, a character train of "IC" is substituted in a variable of "String". In 15b-3, an instruction is made to print the content of "String" in the area from the origin (left upper end) to the position which is away therefrom to the right by the distance of the maximum value (hereinafter, referred to as XMAX) $X_0$ of the coordinate in the horizontal direction and from the origin to the position which is downwardly away therefrom by the distance of the maximum value (hereinafter, referred to as YMAX) $Y_0$ of the coordinate in the vertical direction, that is, in the area of a width of XMAX×0.3 from the left upper end and a height of YMAX×0.3 and on the basis of an interval between characters of XMAX×0.1.

FIG. 5C shows an example of the image description of figure code. First, in 15c-1, an instruction is made to perform the subsequent figure description by the color such that the luminance data of red (R), green (G), and blue (B) are respectively set to 1.0, 0.0, and 0.0, that is, by red. Next, in 15c-2, an instruction is made to draw a straight line from the point in which the coordinate in the horizontal direction is XMAX×0.0 and the coordinate in the vertical direction is YMAX×0.4 to the point in which the coordinate in the horizontal direction is XMAX×1.0 and the coordinate in the vertical direction is YMAX×0.4.

FIG. 5D shows an example of the image description of bit data. First, in 15d-1, an instruction is made to perform the subsequent bit data description by the color in which the luminance data of red (R), green (G), and blue (B) are respectively set to 1.0, 1.0, and 0.5, that is, by light yellow.

Next, in 15d-2 to 15d-6, an instruction is made to substitute 25 bit data into a variable "bit data". In 15d-7, an instruction is made to develop those bit data as the bit data in which the size in the horizontal direction is 5 and the size in the vertical direction is 5 by using the point in which the coordinate in the horizontal direction is XMAX×0.1 and the coordinate in the vertical direction is YMAX×0.5 as a reference.

FIG. 5E shows an example in the case where each of the image descriptions shown in FIGS. 5B to 5C was developed for the image forming apparatus in which XMAX and YMAX are set to 10.

First, characters of "IC" are formed in black in the upper portion by the description of character code shown in FIG. 5B. A red line is drawn at the center by the description of figure code shown in FIG. 5C. A rhombus is formed in light yellow in the lower portion by the description of bit data shown in FIG. 5D. (Control by the CPU)

Figure 6A:
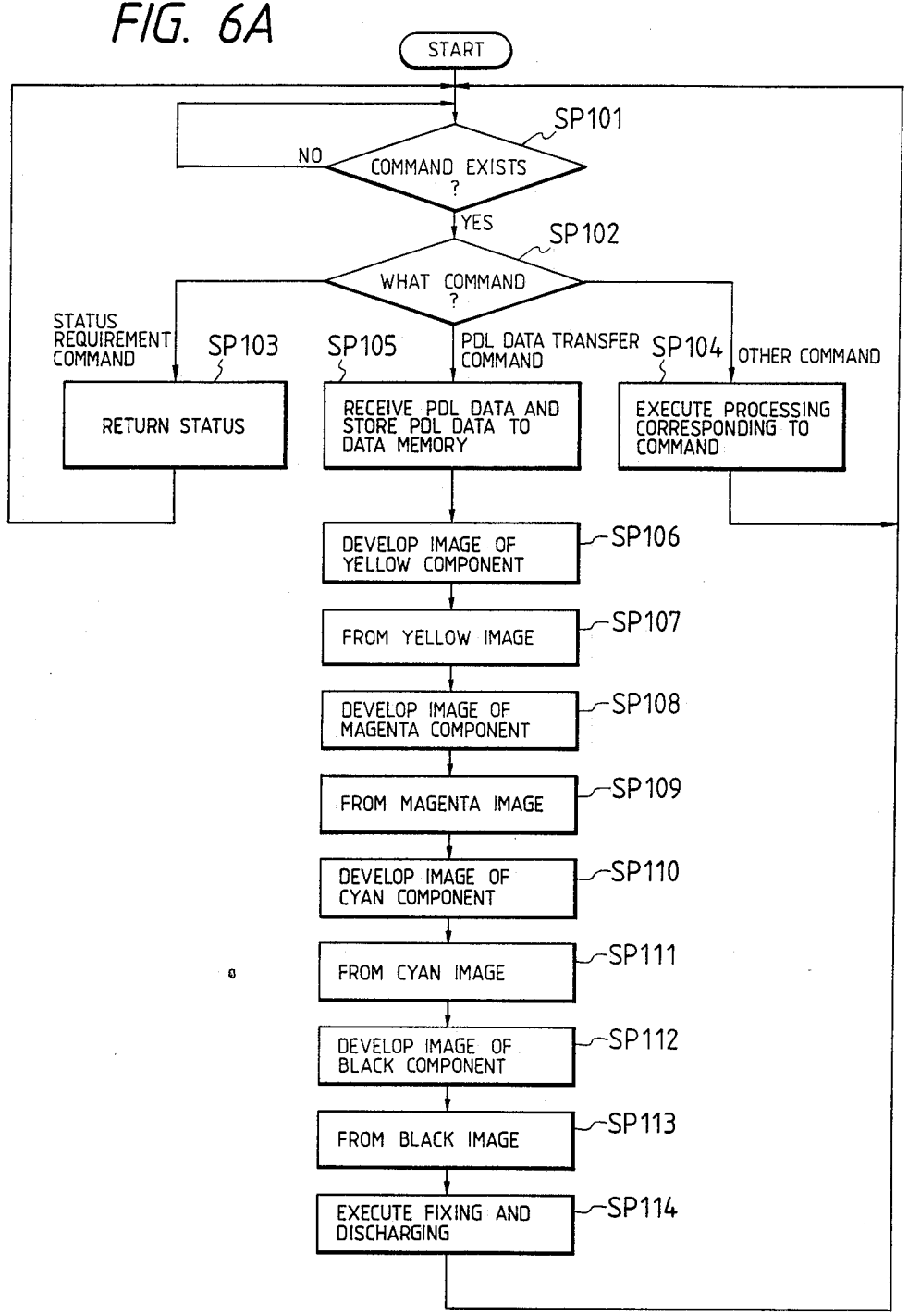
FIGS. 6A and 6B (consisting of FIGS. 6B-1 and 6B-2)--; are control flowcharts.
Figures 1, 6B:
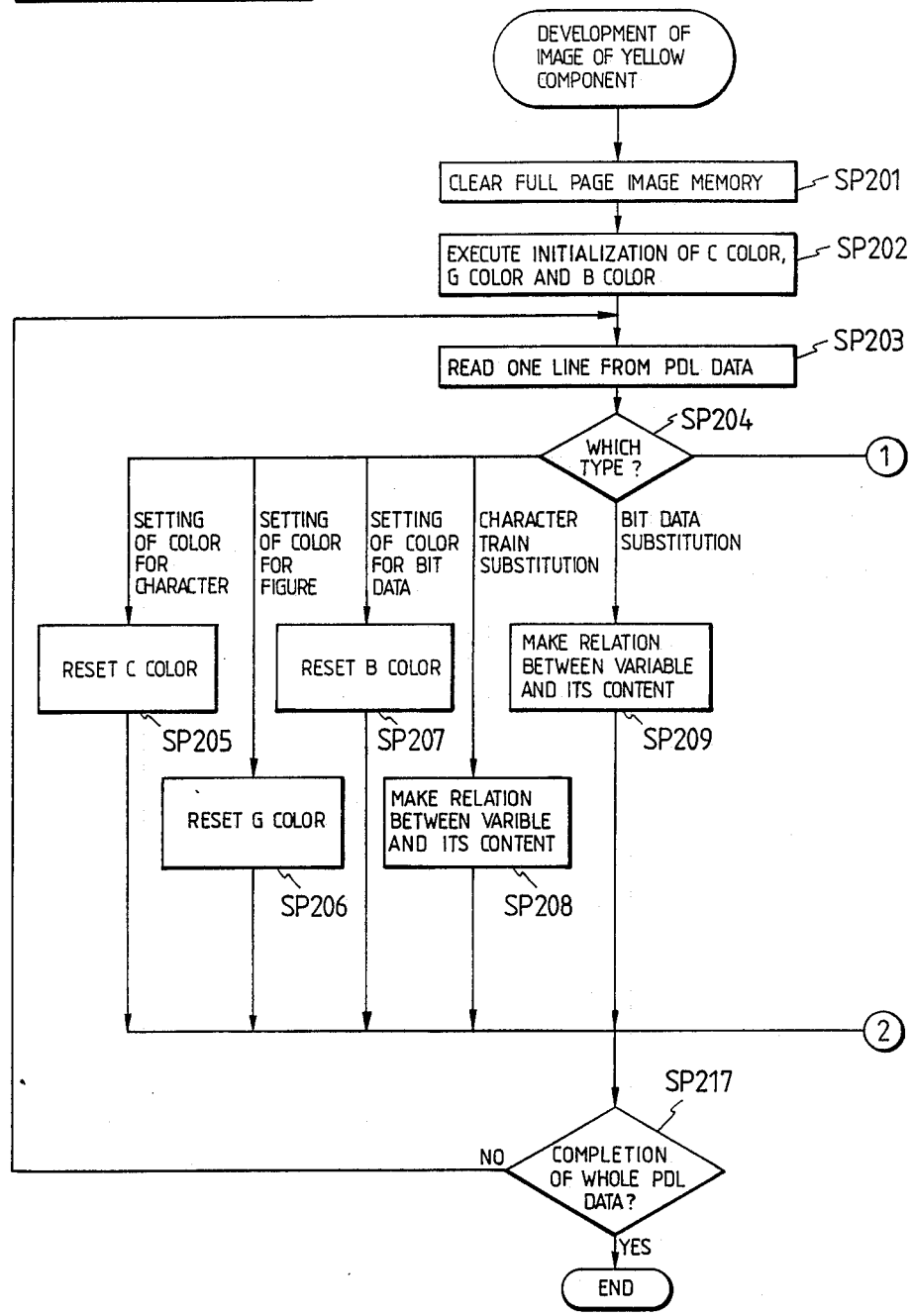
Figures 2, 6B:
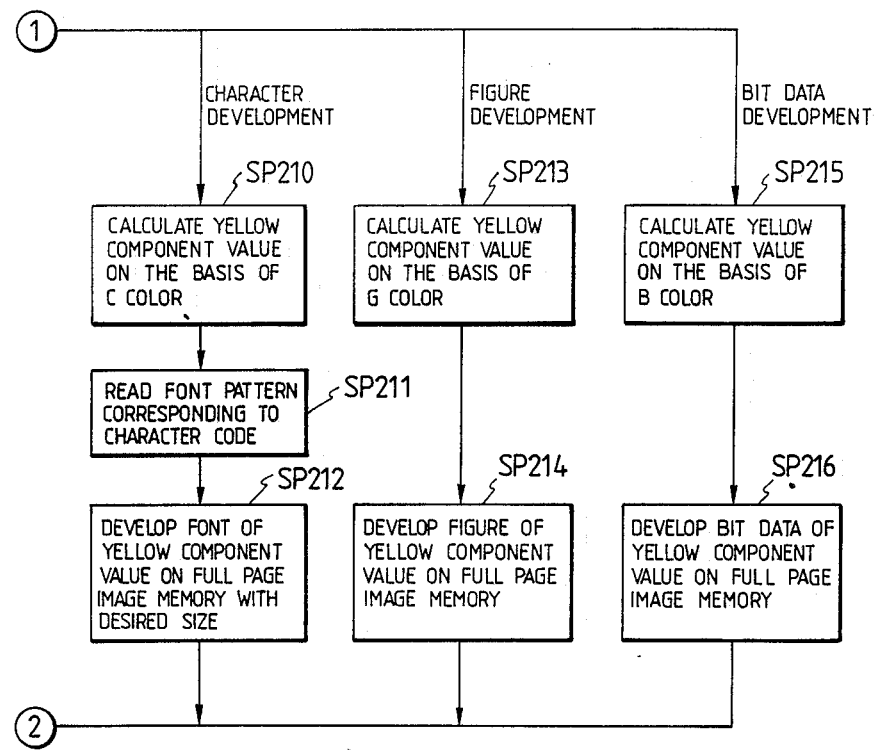

FIGS. 6A and 6B are flowcharts for explaining the control by the CPU 5. First, in step SP101, a check is made to see if a command has been sent from the outer host apparatus or not. If YES, in step SP102, the content of the command is checked. In the case of a status requirement command, the status is returned to the host apparatus in step SP103 and the processing routine is returned to step SP101. In the case of a PDL data transfer command, in steps SP105 to SP114, the PDL data is received and an image is formed on the basis of the PDL data and the processing routine is returned to step SP101. In the case of the other commands, the processing corresponding to each command is executed in step SP104 and the processing routine is returned to step SP101. In the case of the PDL data transfer command, in step SP105, the PDL data is first received from the outer host apparatus and stored into the PDL data memory. Such a transfer process can be also performed by the CPU 5. However, as mentioned above, the PDL data transfer is executed by the DMA transfer due to the DMAC in the embodiment.

In the next step SP106, the PDL data in the PDL data memory is interpreted and the image indicated by the PDL data is developed in the full page image memory 4 with respect to the yellow component.

In step SP107, the image is formed on the basis of the developed yellow component image. In a manner similar to the above, in steps SP108 to SP113, the image development and image formation regarding the yellow component are repetitively executed with respect to the remaining magenta, cyan, and black components, thereby forming a full color image. In the last step SP114, the toners on the paper are fixed and the paper is discharged to the outside of the apparatus.

Step SP106 in FIG. 6A will now be described in detail hereinbelow with reference to the flowchart of FIG. 6B.

In step SP201, the full page image memory is cleared so as not to form an image in the portions other than the subsequently image developed portion. In step SP202, a variable "ccolor" indicative of the color for character, a variable "gcolor" representative of the color for figure, and a variable "bcolor" indicative of the color for bit data are initialized. Those variables are expressed by a set of three luminance data of red (R), green (G), and blue (B).

In the next steps SP203 to SP216, the PDL data of one line is developed and such a line development is repeated for the PDL data of all of the lines in the PDL data memory. In step SP217, a check is made to see if the PDL data of all lines have been developed or not.

First, in step SP203, one line is read out of the PDL data memory. In step SP204, the type of the read line of the PDL data is checked.

In the case of setting the color for character (15b-1 in the example of FIG. 5), "ccolor" is reset in step SP205. In the case of setting the color for figure (15c-1 in the example in FIG. 5), "gcolor" is reset in step SP206. In the case of setting the color for bit data (15d-1 in the example of FIG. 5), "bcolor" is reset in step SP207. When substituting a character train (15b-2 in the example of FIG. 5), the relation between the variable and its content is made in step SP208 by a table or the like set in the working RAM 7. In the case of the bit data substitution (15d-2 to 15d-6 in the example of FIG. 5), the relation between the variable and its content is also similarly made in step SP209.

In the case of the character development (15b-3 in the example of FIG. 5), a yellow component value $D_Y$ is first calculated from "ccolor" in step SP210. Assuming that the red (R), green (G), and blue (B) data constructing "ccolor" are $D_R$, $D_G$, and $D_B$, respectively, the logarithm conversion is first executed in the following manner, thereby obtaining concentration data $D_C'$, $D_M'$, and $D_Y'$ of their complementary colors of cyan (C), magenta (M), and yellow (Y).

$$D_C' = LG(D_R) \; 0 \leq D_R < 10 \leq D_C' \leq 1$$
$$D_M' = LG(D_G) \; 0 \leq D_G \leq 10 \leq D_M' \leq 1$$
$$D_Y' = LG(D_B) \; 0 \leq D_B \leq 10 \leq D_Y' \leq 1$$

(where, LG denotes a proper function for the concentration data by the logarithm conversion)

Next, the black toner amount is calculated from the above data and is set to the amount of black toner and there is executed the undercolor removing (UCR) operation to reduce the amount of toner which is added to each toner in accordance with the added black toner amount. Assuming that MIN(a, b, c) is a function to obtain the minimum value among a, b, and c, $D_Y''$, $D_M''$, $D_C''$, and $D_K$ are obtained as follows.

$$D_K' = \text{MIN}(D_C', D_M', D_Y')$$
$$D_Y'' = D_Y' - (a_1 \times D_K' - b_1)$$
$$D_M'' = D_M' - (a_2 \times D_K' - b_2)$$
$$D_C'' = D_C' - (a_3 \times D_K' - b_3)$$
$$D_K = (a_4 \times D_K' - b_4)$$

(where, $a_1$, $a_2$, $a_3$, $a_4$, $b_1$, $b_2$, $b_3$, and $b_4$ are constants.)

Further, with respect to the yellow, magenta, and cyan components, since images are not formed by the ideal color materials, the color correction is executed by performing the masking calculations.

$$D_Y''' = D_Y'' \times (aY_1) + D_M'' \times (-bM_1) + D_C'' \times (-cC_1)$$
$$D_M''' = D_Y'' \times (-aY_2) + D_M'' \times (bM_2) + D_C'' \times (-cC_2)$$
$$D_C''' = D_Y'' \times (-aY_3) + D_M'' \times (-bM_3) + D_C'' \times (-cC_3)$$

Finally, since these values are floating points, they are normalized to the values 0 to 255 which are actually stored into the full page image memory 4.

$D_Y = 0$ (when $C_Y \times D_Y'''$ is 0 or less)

(where, $C_Y$ is a constant)

$D_Y = 255$ (when $C_Y \times D_Y'''$ is 255 or more)
$D_Y = C_Y \times D_Y'''$ (when $0 < C_Y \times D_Y''' < 255$)

The same shall also apply with respect to $D_C$, $D_M$, and $D_K$.

In step $SP_{210}$, the yellow component value $D_Y$ is calculated as mentioned above. In the case of developing the other color component image, the value of its color component is calculated.

In the next step $SP_{211}$, the font pattern corresponding to the character code is read out of the font ROM 31 and developed into the memory 4 in step $SP_{212}$. At this time, $D_Y$ is used as data to be written and the image is enlarged or reduced to the indicated size. Since the enlarging or reducing process can be easily realized by software, it is not explained here.

In the case of the figure development (15c - 2 in the example of FIG. 5C), in step $SP_{213}$, the yellow component value $D_Y$ is first calculated from "gcolor" in a manner similar to step $SP_{210}$. In step $SP_{214}$, a figure is written into the memory 4 by using the value $D_Y$. Since the algorithm to draw the indicated figure such as a line, circle, or ellipse by software is generally known, it is not described here.

In the case of the bit image development (15d -7 in the example of FIG. 5D), in step $SP_{215}$, the yellow component value $D_Y$ is first calculated from "bcolor" in a manner similar to step $SP_{210}$. In step $SP_{216}$, the bit data is written into the memory 4 by using the value $D_Y$.

In the case of the image development in steps $SP_{212}$, $SP_{214}$, and $SP_{216}$, as mentioned above, the address is calculated by setting the horizontal coordinate value to the less significant value and by setting the vertical coordinate value to the more significant address.

As explained above, the yellow component image of the input PDL data can be developed in the memory 4 in accordance with the control flow shown in FIG. 6B. The development regarding the magenta, cyan, and black components in steps $SP_{108}$, $SP_{110}$, and $SP_{112}$ in FIG. 6A can be also similarly executed.

In the embodiment, the CPU 5 to execute the processes in steps $SP_{212}$, $SP_{214}$, and $SP_{216}$ in FIG. 6B has been used as image developing means for developing the information input by the input means into the image memory information with respect to one output color component, and the operations to repeat the image development and image formation with respect to a plurality of output color components have been accomplished by executing the processes in steps SP106 to SP114 by the CPU 5.

As described above, according to this embodiment, only the bit map memory which is necessary for the development of one color component is provided and by repeating
① the development of the portion regarding the color component of the PDL data into the bit map memory and
② the formation of the color component image using the data in the bit map memory
for every image formation of each color component, a full color printer which receives the PDL data as input data can be constructed by a small memory capacity.

As described above, according to the embodiment, a color image can be formed by the small memory capacity.

In a color image forming apparatus in the second embodiment of the invention which will be explained hereinbelow, there is disclosed a color image forming apparatus in which two bit map memories are provided, and by repeating ① the development of the portion regarding the color component of the PDL data into one of the bit map memories and ② the formation of the color component image using the data of the bit map memory every image formation of each color component, a color image can be formed by the small bit map memory capacity, and further by enabling the image development into one of the bit map memories, reading operation from the other bit map memory, and image formation to be independently executed, both of the image development and the image formation can be executed in parallel and the whole processing speed can be raised. However, the invention is not obviously limited to such an apparatus.

The construction and operation of the second embodiment will be described in detail hereinbelow with reference to the drawings.

Figure 7:
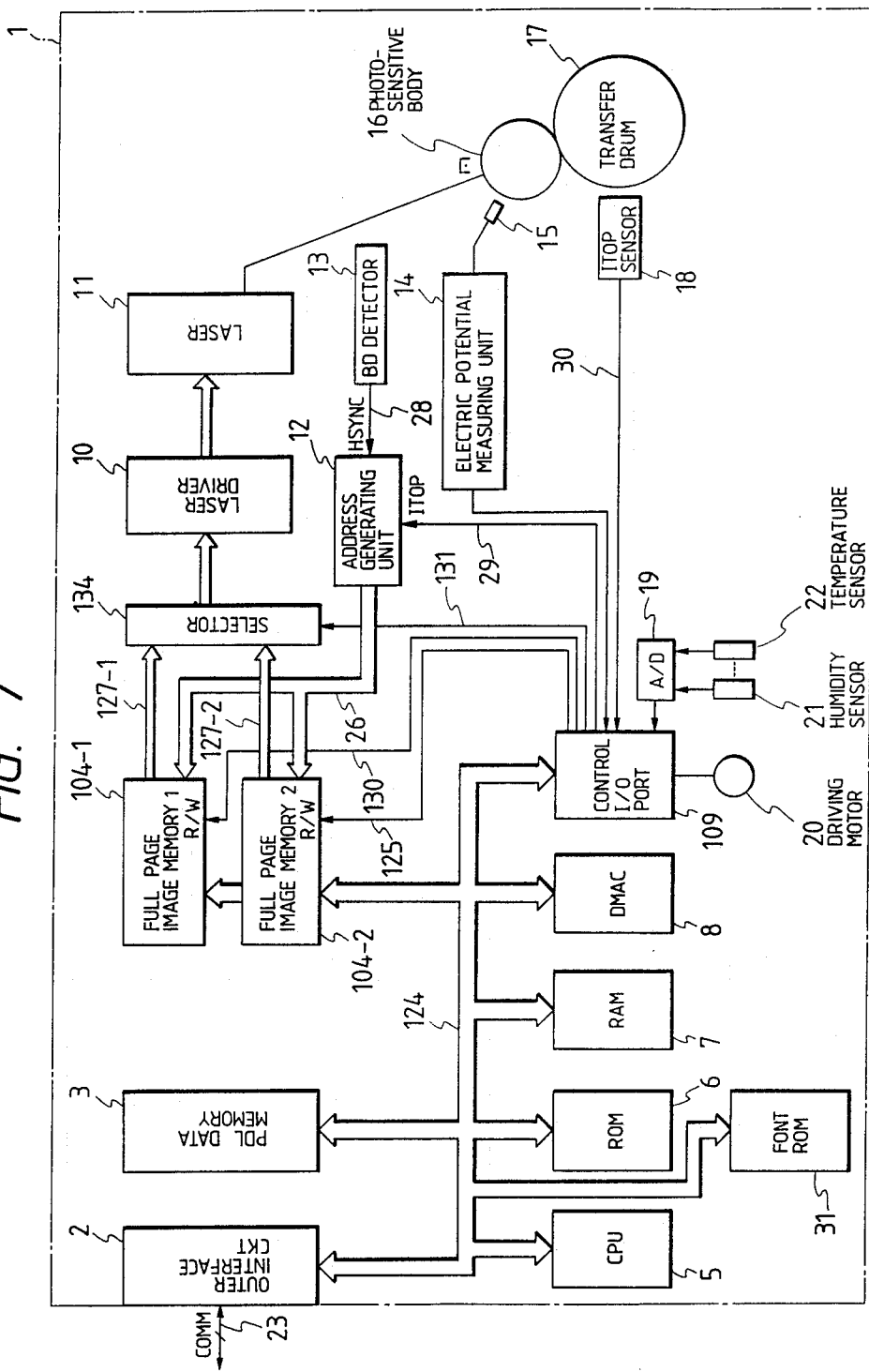
FIG. 7 is a block diagram of a color printer in the second embodiment of the invention.

FIG. 7 is a block diagram of a color printer in the second embodiment.

In FIG. 7, the descriptions of the parts and components which have already been explained in FIG. 1 are omitted.

In FIG. 7, reference numeral 124 denotes the CPU (Central Processing Unit) bus including the address bus and data bus. The CPU 5, ROM (Read Only Memory) 6, RAM (Random Access Memory) 7, DMAC (Direct Memory Access Controller) 8, control I/O port 9, font ROM 31, PDL data memory 3, full page image memories 104-1 and 104-2 are connected to the CPU bus 124, thereby enabling the data transfer among them and the control by the CPU 5 to be performed. Each of the memories 104-1 and 104-2 has the memory capacity which can store the data of one color of the color image data of one original.

Each of the memories 104-1 and 104-2 has the memory capacity with respect to at least one color of the color image of one original. Both of the writing and reading accesses of data by the CPU bus and the reading access by the address which is generated from the address generating unit 12 can be performed. Both of those accessing modes can be independently switched by control signals 125 and 130 from a control I/O port 109. The foregoing image development is executed by switching the accessing mode to the accessing side by the CPU bus. After completion of the development into one of the full page image memories 104-1 and 104-2 with respect to one output color component, the CPU 5 switches the accessing mode to the developed full page image memory to the side of the address generating unit. The color component image data which was read out of the memory in accordance with the address generated from the address generating unit is input to the laser driver 10 through a selector 134 and the laser 11 is driven, so that an image is formed. The selector 134 switches and selects one of the outputs from the memories 104-1 and 104-2 in response to a selecting signal 131 from the control I/O port 109. The memory side to be read out by the CPU 5 is selected.

The CPU 5 in the embodiment repeats the processes such as image development with respect to one output color component and formation of the output color component image by the developed output color component image data with respect to each of the output color components of yellow, magenta, cyan, and black, thereby forming a full color image.

For instance, when considering the first image formation in which the yellow component signal is output from the memory 104-1, the dot image of the yellow component of an original is first exposed onto the photosensitive drum 91 (see FIG. 2) and developed by the developing device 92 of yellow.

Next, for the yellow image, the yellow toner image is transferred and formed by the transfer charging device 98 onto a paper wound on the transfer drum 96 at the contact between the photosensitive drum 91 and the transfer drum 96. By the same processes as those mentioned above, in the second image formation, the magenta component signal is output from the memory 104-2 and the magenta toner image is transferred and formed. On the other hand, in the third image formation, the cyan component signal is output from the memory 104-1. In the fourth image formation, the black component signal is output from the memory 104-2. The cyan and black toner images are repetitively transferred and formed in accordance with the cyan and black component signals, respectively. In this manner, a color image is finally formed by four color toners by overlaying the respective color images onto the paper. (Control by the CPU)

Figures 1, 8A:
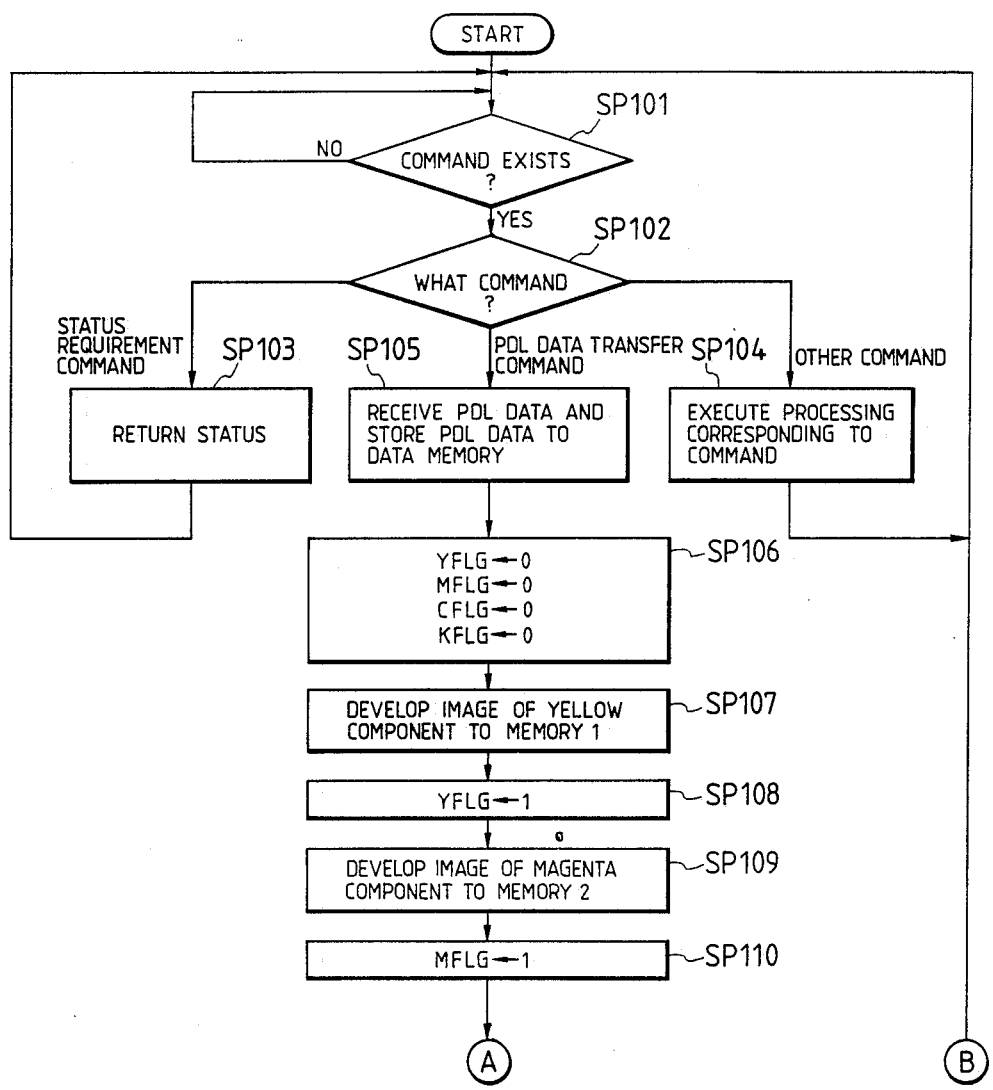
FIGS. 8A (consisting of FIGS. 8A-1 and 8A-2)--. and 8B are control flowcharts for the second embodiment.
Figures 2, 8A:
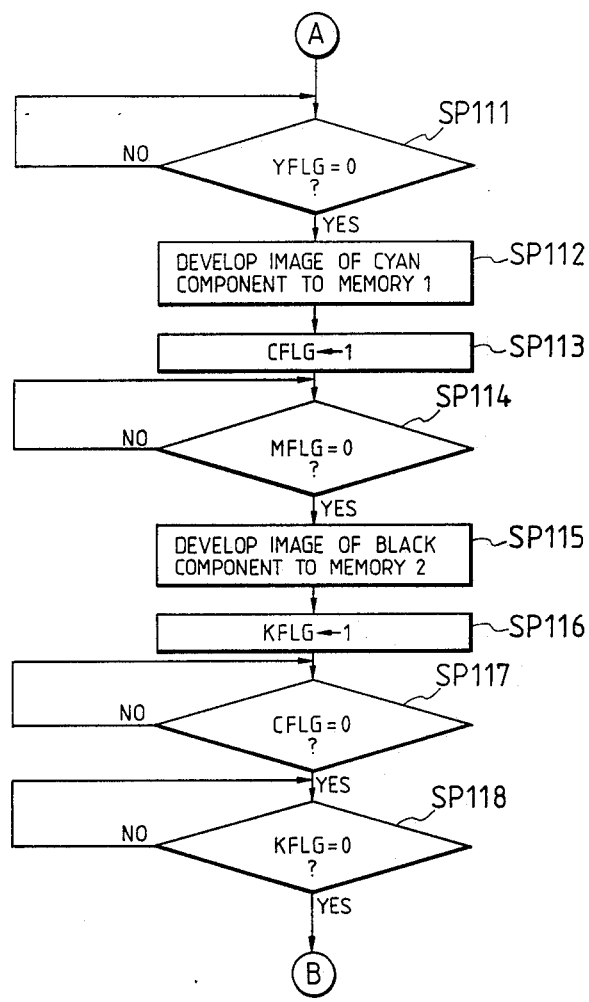
Figure 8B:
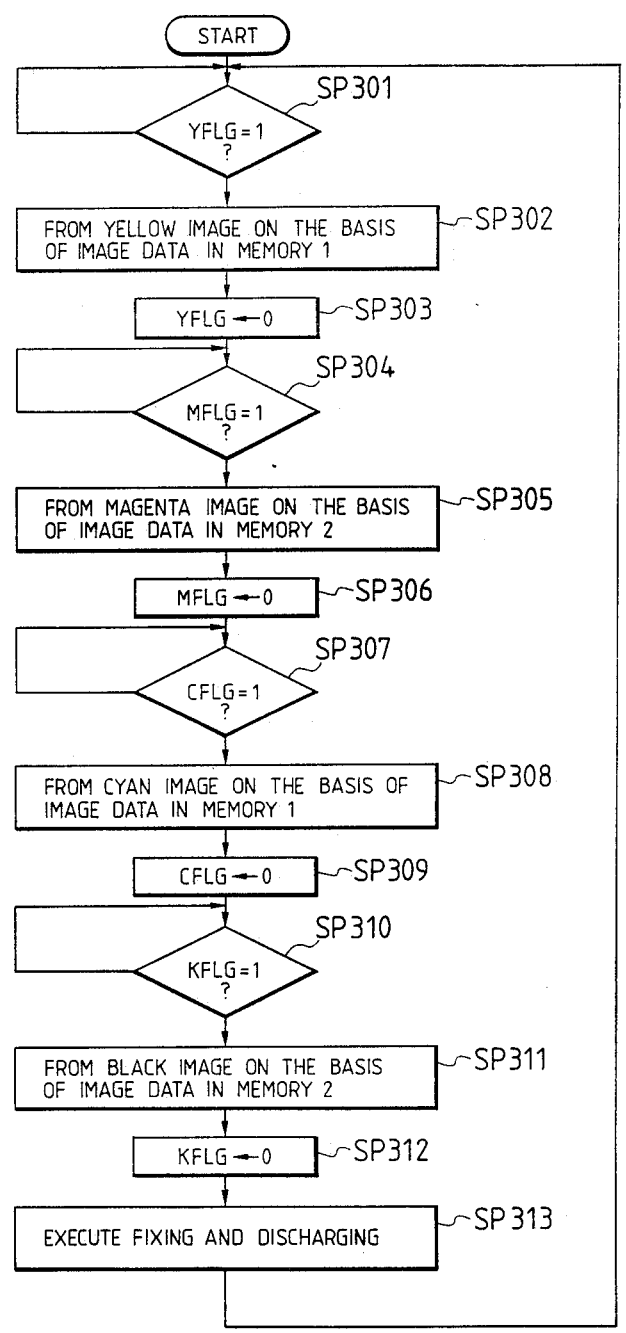

FIGS. 8A and 8B are flowcharts for explaining the control by this CPU 5. In the embodiment, the CPU 5 executes the control by what is called multi-tasks. The main task shown in FIG. 8A and the image forming task shown in FIG. 8B execute the parallel processings in a pseudomanner. First, in step SP101, a check is made to see if a command has been sent from the outer host apparatus or not. If YES, the content of the command is checked in step SP102. In the case of a status requirement command, the status is returned to the host apparatus in step SP103 and the processing routine is returned to step SP101. In the case of a PDL data transfer command, in steps SP105 to SP118, the PDL data is received and an image is formed on the basis of it and the processing routine is then returned to step SP101. In the case of the other commands, the processing corresponding to each command is executed in step SP104 and the processing routine is returned to step SP101. In the case of the PDL data transfer command, in step SP105, the PDL data is first received from the outer host apparatus and stored into the PDL data memory. Although such a data transfer can be also executed by the CPU 5, it is performed by the DMA transfer due to the DMAC in the embodiment as mentioned above.

Since the processing in step SP107 in FIG. 8A is similar to that explained in FIG. 6B, its description is omitted.

The yellow component image of the input PDL data can be developed in the full page image memory 4 in accordance with the control flow shown in FIG. 6B explained above. The development regarding each of the magenta, cyan, and black components in steps SP109, SP112, and SP115 in FIG. 8A is also similarly executed.

The image forming task will now be described in accordance with the flowchart of FIG. 8B. First, in step SP301, a check is made to see if a flag YFLG is set to 1. As described in FIG. 8A, since the YFLG is set to 1 when the yellow image was developed in the memory 4, the yellow component image is formed on the basis of the image data in step SP302. After completion of the image formation, the YFLG is reset to 0 in step SP303, thereby informing the end of image formation to the main task. Likewise, in steps SP304 to SP306, the magenta image is formed. In steps SP307 to SP309, the cyan image is formed. In steps SP310 to SP312, the black image is formed. In the final step SP313, the toners on the paper are fixed and a paper is discharged to the outside of the apparatus. Then, the processing routine is returned to step SP301 and one color image is formed in this manner.

In the embodiment, the full page image memories 104-1 and 104-2 have been used as image memory means into or from which data can be independently written or read out and the bit map memories whose resolutions are equal to that of the image forming apparatus have been used. However, the enlarging processing can be also performed at the time of the image formation by using frame memories whose resolutions are smaller than that of the image forming apparatus.

As described above, according to the embodiment, two bit map memories are used and the development of one color component image into each of the bit map memories, the reading operation of data from the other bit map memory, and the image formation can be independently executed in parallel. Therefore, a color printer whose processing speed is high and which receives the PDL data as the input data can be constructed by a small bit map memory capacity.

The third embodiment of the present invention will now be described. In the third embodiment, there is disclosed an image forming apparatus comprising:

input means for inputting at least one of coded character information, coded figure information, and bit image information;

a plurality of image memory means corresponding to the color components of the character information, figure information, and bit image information which are input;

image developing means for developing an image indicated by each of those information into the corresponding image memory means with respect to each input color component;

processing means for image processing each of the input color component data in the plurality of image memory means and for calculating a plurality of color component data; and image forming means for forming each output color component image in accordance with the value of each of the output color component data.

According to the third embodiment, the optimum image can be formed in the image forming apparatus such as a color printer or the like having output color components different from input color components.

Figure 9:
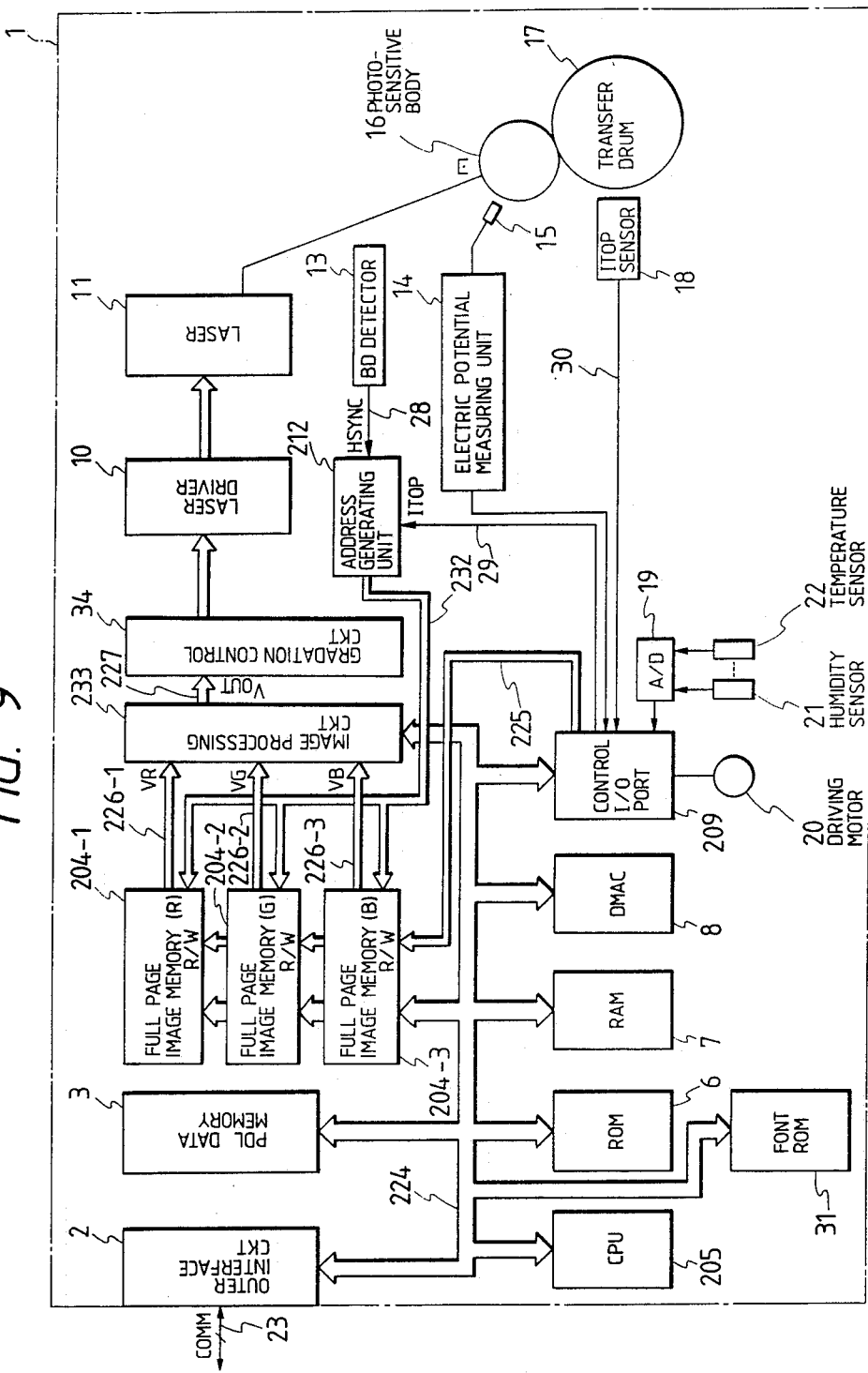
FIG. 9 is a block diagram of a color printer in the third embodiment of the invention.

FIG. 9 is a block diagram of a color printer in the third embodiment.

In FIG. 9, the descriptions with respect to the parts and components which have already been described in FIG. 1 are omitted.

In FIG. 9, reference numeral 224 denotes a CPU (Central Processing Unit) bus including an address bus and a data bus. The CPU 205, ROM (Read Only Memory) 6, RAM (Random Access Memory) 7, DMAC (Direct Memory Access Controller) 8, a control I/O port 209, font ROM 31, PDL data memory 3, and full page image memories 204-1, 204-2, and 204-3 are connected to the CPU bus 224, thereby enabling the data transfer among them and the control by the CPU 205 to be executed. The ROM 6 stores the programs for the CPU 205. The RAM 7 is the working RAM for the CPU 205. The CPU 205 communicates with the outer host apparatus through the outer interface circuit 2 and receives and transmits various kinds of commands, status, and image data. When a PDL data transfer command among the commands is received, the CPU 205 makes the DMAC 8 operative, thereby allowing the PDL data which is subsequently transferred through the outer interface circuit 2 to be DMA (Direct Memory Access) transferred to the PDL data memory 3. The DMA transfer is a data transferring method which is used in the general microcomputer system. After completion of the transfer of all of the PDL data, the CPU 205 first clears the full page image memories 204-1, 204-2, and 204-3. The clearing operation of the memory in this case denotes that a value such as not to form an image at the time of the image formation which will be explained hereinlater is written into the memory. In the case of this embodiment, the memories are cleared by writing the value 0 by the CPU 205. However, such a value can be also written by hardware like a simple circuit consisting of a clock generator and a counter. The CPU 205 then interprets the PDL data held in the PDL data memory 3 and develops the image indicated by the PDL data into the memories 204-1, 204-2, and 204-3 with respect to the red, green, and blue components, respectively. The developing method will be explained in detail hereinlater. For the full page image memories 204-1 to 204-3, both of the writing and reading accesses of data by the CPU bus and the reading access by the address which is generated from an address generating unit 212 can be executed. These accessing modes are switched by a control signal 225 from the control I/O port 209. The foregoing image development is performed by switching the accessing mode to the accessing side by the CPU bus. After completion of the development into the full page image memories with regard to each of the R, G, and B color components, the CPU 205 switches the accessing mode to the full page image memories to the address generating unit side. Color component image data VR 226-1, VG 226-2, and VB 226-3 which are simultaneously read out from the memories 204-1, 204-2, and 204-3 in accordance with the addresses generated from the address generating unit are input to an image processing circuit 233, by which one output color component data is calculated and an image forming signal $V_{OUT}$ 227 is output. The reading signal and image forming signal from the full page image memories are calculated every image formation of four times, which will be explained hereinlater. In correspondence to each image formation, the yellow, magenta, cyan, or black component image is output as the image forming signal $V_{OUT}$ 227. An output of the image processing circuit 233 is input to a gradation control circuit 34 and is gradation corrected by an LUT (Look-Up Table) or the like so as to correspond to the color reproduction concentration of the printer. The gradation corrected data is input to the laser driver 10 and the laser 11 is driven, thereby forming an image.

The CPU 205 repeats the processes such that the red, green, and blue component image data developed in the respective full page image memories are image processed and one output color component data is calculated, thereby forming an image as mentioned above with respect to each of the yellow, magenta, cyan, and black output color components. In this manner, a full color image is formed.

In addition to the communication with the outer apparatus, the CPU 205 controls each of the control elements of the color printer 1 through the I/O port.

The whole construction of the color printer in the embodiment is as explained in FIG. 2. The construction of the address generating unit 212 is also as explained in FIG. 3.

Figure 10:
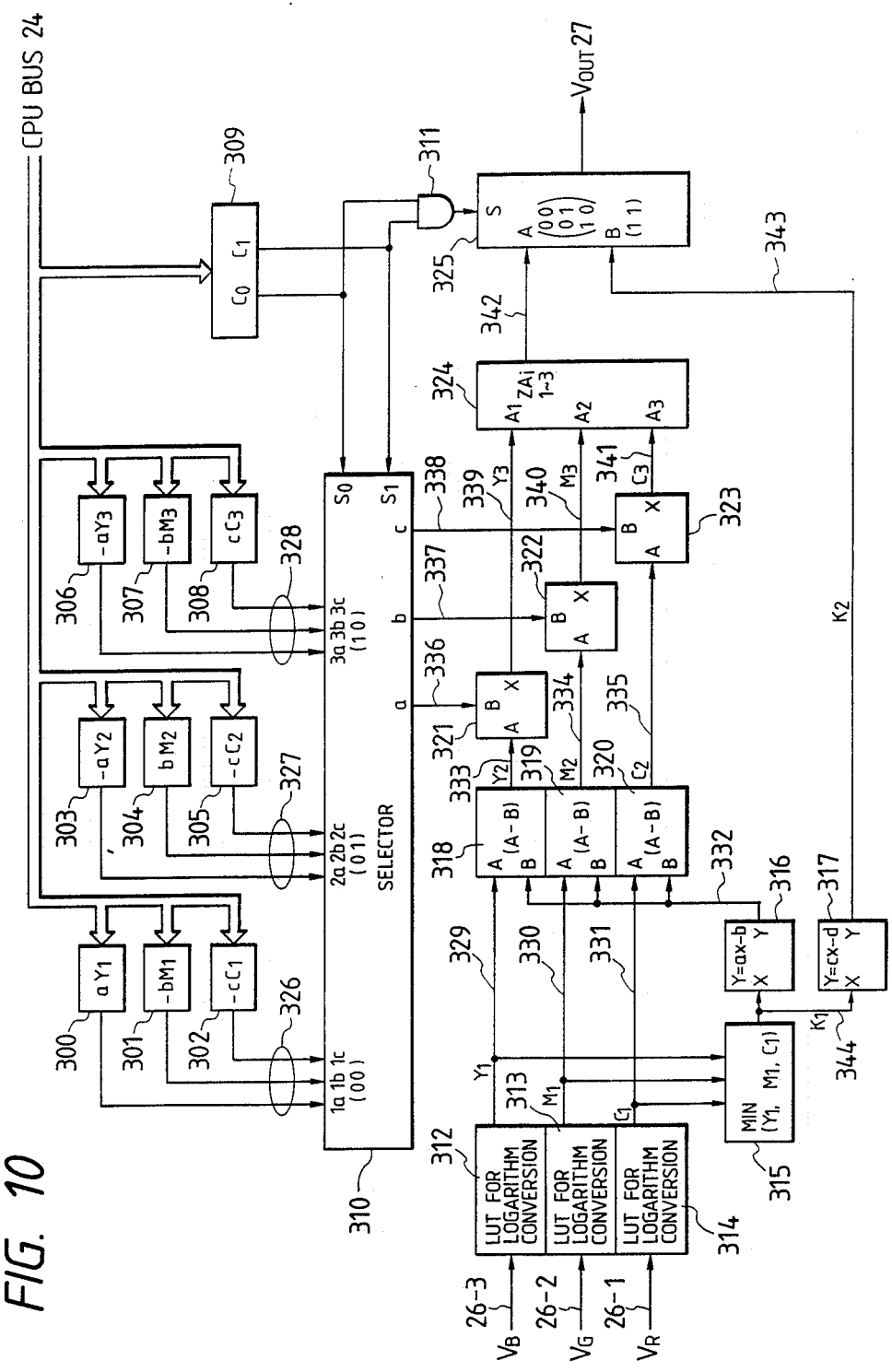
FIG. 10 is a block diagram showing an arrangement of an image processing circuit 233 shown in FIG. 9.

FIG. 10 shows a block diagram of the image processing circuit 233 shown in FIG. 9. The input color component signals VB 26-3, VG 26-2, VR 26-1 are supplied to an LUT 312 for logarithm conversion, by which the luminance data of B, G, and R are converted into concentration data $Y_1$, $M_1$, and $C_1$ of Y, M, and C. At this time point, the concentration data correspond to the toner concentration values of yellow, magenta, and cyan in the output image. Outputs for R (red), G (green), and B (blue) correspond to the toner amounts of C (cyan), M (magenta), and Y (yellow), respectively. Therefore, the subsequent color image data are handled by the color components of Y, M, and C.

Outputs of LUTs 312 to 314 for logarithm conversion are used to calculate $K_1$ $$K_1 = MIN(Y_1, M_1, C_1)$$

by a minimum value calculating circuit 315. $K_1$ represents the minimum value among $Y_1$, $M_1$, and $C_1$. The value of $K_1$ is used as a basic value when calculating the black toner amount in the case of supplementing the black toner and is also used as a reference value when calculating the reduction amount or undercolor removal (UCR) amount of the other color component toners in association with the supply of the black toner. In a circuit 317, $K_1$ is first subjected to a conversion of $Y = cs - d$ (c and d are constants) and becomes black component data $K_2$ 343 and is input to a selector 325. Further, $K_1$ is subjected to a conversion of $Y = ax - b$ (a and b are constants) by a circuit 316 and an UCR amount 332 is output. UCR circuits 318 to 320 subtract the UCR amount 332 from the color component data $Y_1$, $M_1$, and $C_1$ of Y, M, and C, thereby obtaining $Y_2$, $M_2$, and $C_2$, respectively. The relations among $Y_2$, $M_2$, $C_2$, $K_2$, $V_B$, $V_G$, and $V_R$ will be summarized as follows.

$$K_1 = MIN(LG(VB), LG(VG), LG(VR))$$
$$K_2 = c \times K_1 - d$$
$$Y_2 = LG(V_B) - (a \times K_1 - b)$$

-continued
$$M_2 = LG(V_G) - (a \times K_1 - b)$$
$$C_2 = LG(U_R) - (a \times K_1 - b)$$

(where, LG denotes a logarithm and a, b, c, and d are constants)

The outputs $Y_2$, $M_2$, and $C_2$ of the UCR circuits are subjected to the masking correction to perform the color correction by the following primary equation.

$$\begin{bmatrix} Y_3 \\ M_3 \\ C_3 \end{bmatrix} = \begin{bmatrix} ay_1 - bM_1 - cC_1 \\ -aY_2 - bM_2 - cC_2 \\ -aY_3 - bM_3 - cC_3 \end{bmatrix} \begin{bmatrix} Y_2 \\ M_2 \\ C_2 \end{bmatrix}$$ (equation 1)

Such a masking correction is generally performed since the toner as a color material does not have the ideal color characteristic.

The circuit of FIG. 10 executes the correction in the following manner.

First, nine parameters of $aY_1$, $-bM_1$, $-cC_2$, $-aY_2$. etc. are set into latches 300 to 308 by the CPU bus. The parameters are input to a selector 310 and every three of them are selected in accordance with either one of $Y_3$, $M_3$, and $C_3$ to be calculated. That is, when $Y_3$ is calculated, a set of $aY_1$, $-bM_1$, and $-cC_1$ are selected. When $M_3$ is calculated, a set of $-aY_2$, $bM_2$, and $-cC_2$ are selected. When $C_3$ is calculated, a set of $-aY_3$, $-bM_3$, and $cC_3$ are selected. The selection is executed by output color component selecting signals $C_0$ and $C_1$ which are set into a latch 309 by the CPU bus. The parameters are selected such that $Y_3$ is calculated when $C_0$ and $C_1$ are set to (0, 0), $M_3$ is calculated when (0, 1), and $C_3$ is calculated when (1, 0). In multipliers 321 to 323, the selected parameters are respectively multiplied by the color component data $Y_2$, $M_2$, and $C_2$. The results are added by an adder 324 and the result of the addition is input as a signal 342 to the selector 325.

The selector 325 selects the black component data $K_2$ when the output color component selecting signals $C_0$ and $C_1$ are set to (1, 1). In the other cases, the selector 325 selects an output of the adder 324. Thus, the masking corrected yellow component image is output when $C_0$ and $C_1$ are set to (0, 0) as the image forming signal $V_{OUT}$ 27. Similarly, the magenta component image is output when (0, 1), the cyan component image is output when (1, 0), and the black component image is output when (1, 1).

Figure 11B:
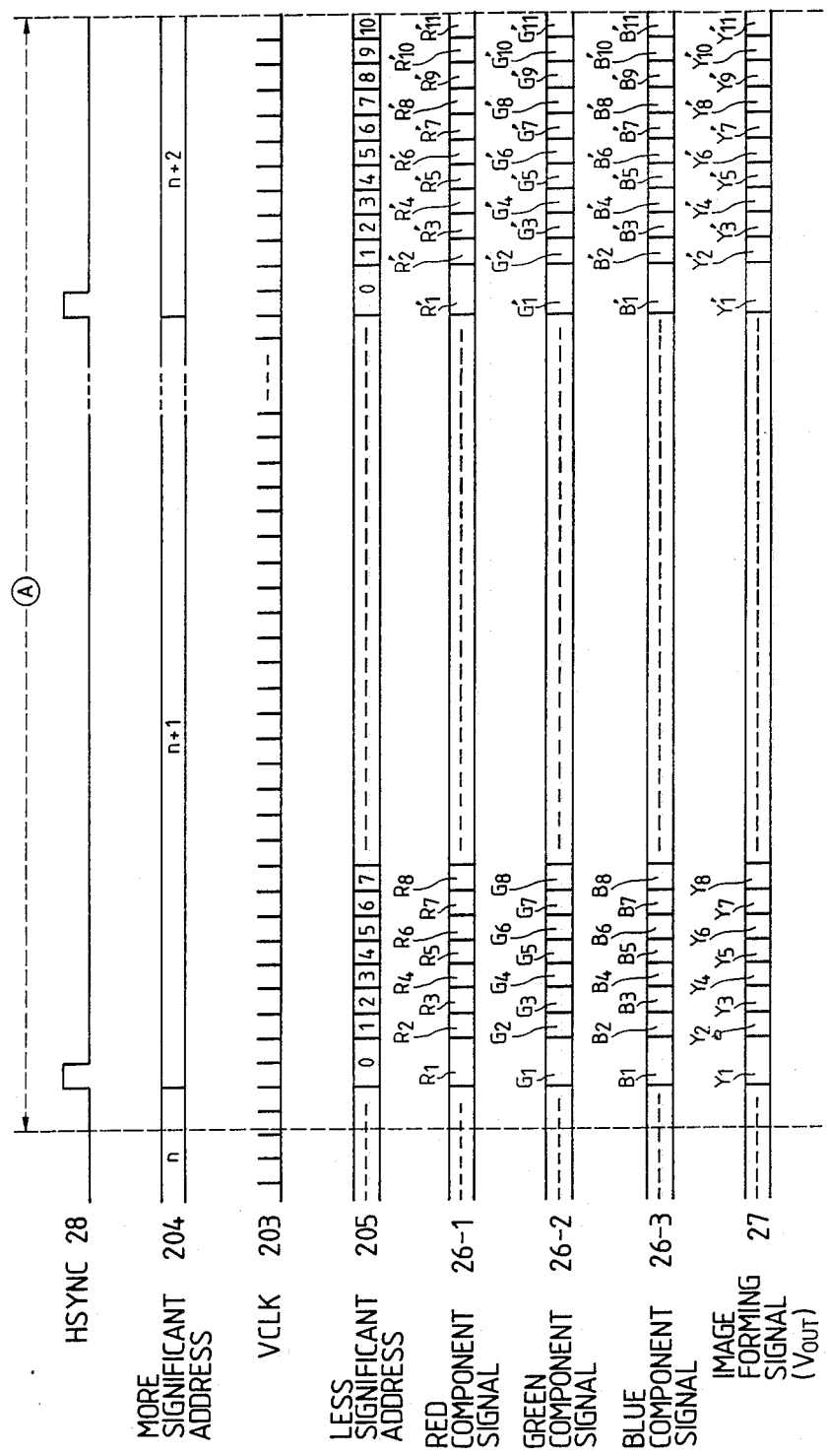

FIG. 11A is a timing chart for the vertical sync signal (ITOP) 29 and horizontal sync signal (HSYNC) 28 which are input to the address generating unit when the image formation of four times is executed, a more significant address 2204 in the full page image memories 204-1 to 204-3 which is generated from the address generating unit, the respective color component signals 226-1 to 226-3 which are read out from the full page image memories by those addresses, and the image forming signal $V_{OUT}$ 227 which is formed from those signals by the image processing circuit 233. As shown in the diagram, subsequent to each vertical sync signal, the yellow, magenta, cyan, and black component data are made and sent to the laser driver 10. In the diagram, the more significant address has been illustrated so as to be continuously changed in order to enable the diagram to be easily seen. However, since the more significant address is actually the output value of the counter which receives the HSYNC signal, it has a stairway-like shape synchronized with the HSYNC. FIG. 11B is a timing chart for each signal in the interval of (A) in FIG. 11A. This timing chart relates to the interval from one horizontal sync signal (HSYNC) 28 to the next horizontal sync signal and indicates the timing for each signal in one horizontal interval. The more significant address 204 is counted up one by one every HSYNC. The less significant address 205 is reset to 0 by the HSYNC and is counted up one by one by the image carrier clock 203. The data in the address designated by the less significant address 205 and more significant address 204 in the full page image memory 4 is read out and becomes each of the color component signals 226-1, 226-2, and 226-3. Therefore, $R_1$ to $R_8$ in FIG. 11B denote the data in the more significant address n+1 and less significant addresses 0 to 7, respectively. $R_1'$ to $R_8'$ indicate the data in the more significant address n+2 and less significant addresses 0 to 7, respectively. That is, $R_1$ to $R_8$ indicate the image data at the positions which are deviated by only one address in the vertical direction for $R_1'$ to $R_8'$. The same shall also apply with respect to $G_1$ to $G_8$ and $G_1'$ to $G_8'$ and to $B_1$ to $B_8$ and $B_1'$ to $B_8'$. On the other hand, the image forming signals $Y_1$ to $Y_8$ which are calculated correspond to $R_1$ to $R_8$, $G_1$ to $G_8$, and $B_1$ to $B_8$, respectively. Since the color component signals 226-1 to 226-3 are processed by the image processing circuit 233 and the image forming signal 227 is output, a time delay occurs between each color component signal and the image forming signal. However, the time delay difference is set to 0 for simplicity of explanation in FIG. 11.

Figure 12A:
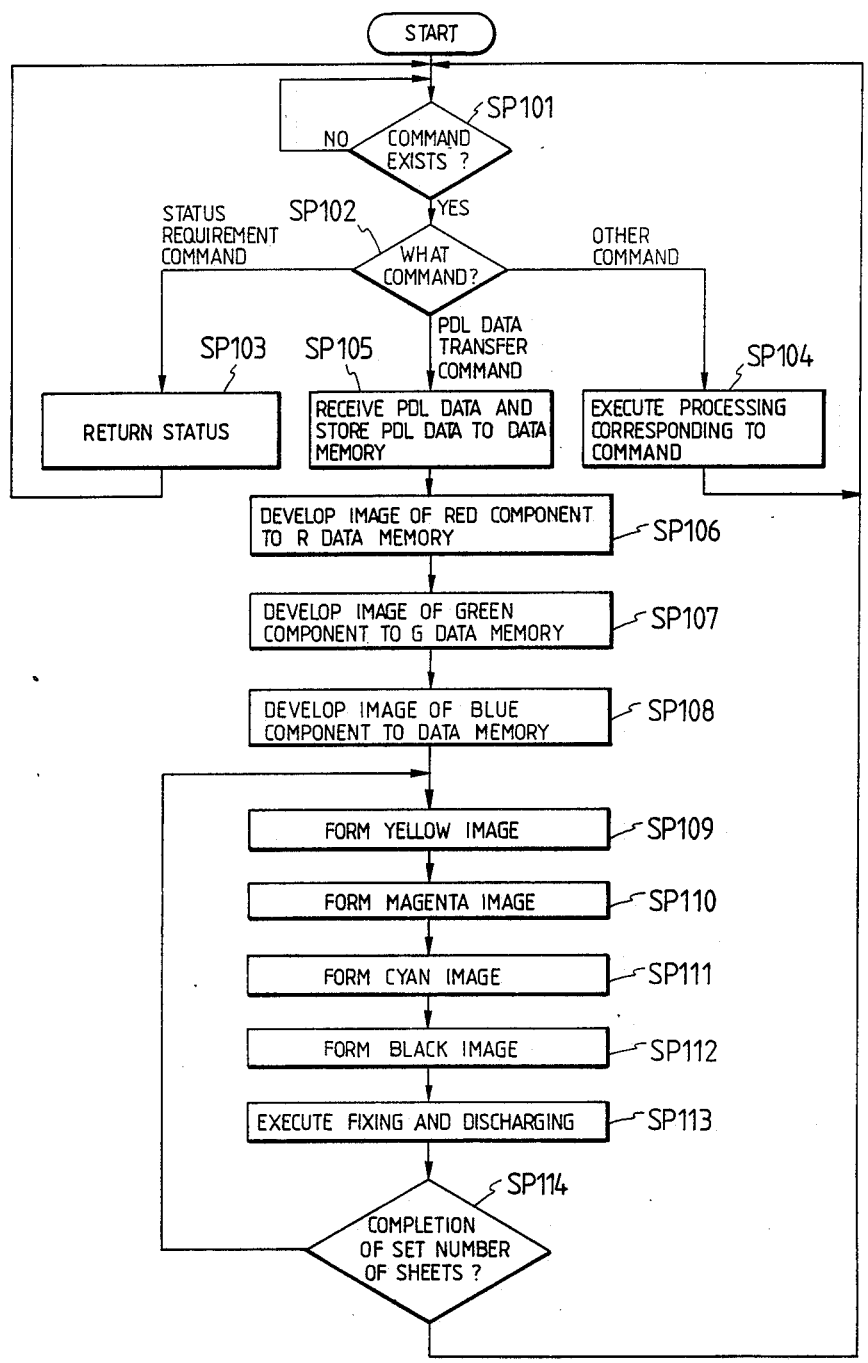
FIGS. 12A and 12B (consisting of FIGS. 12B-1 and 12B-2)--; are flowcharts for the third embodiment.
Figures 1, 12B:
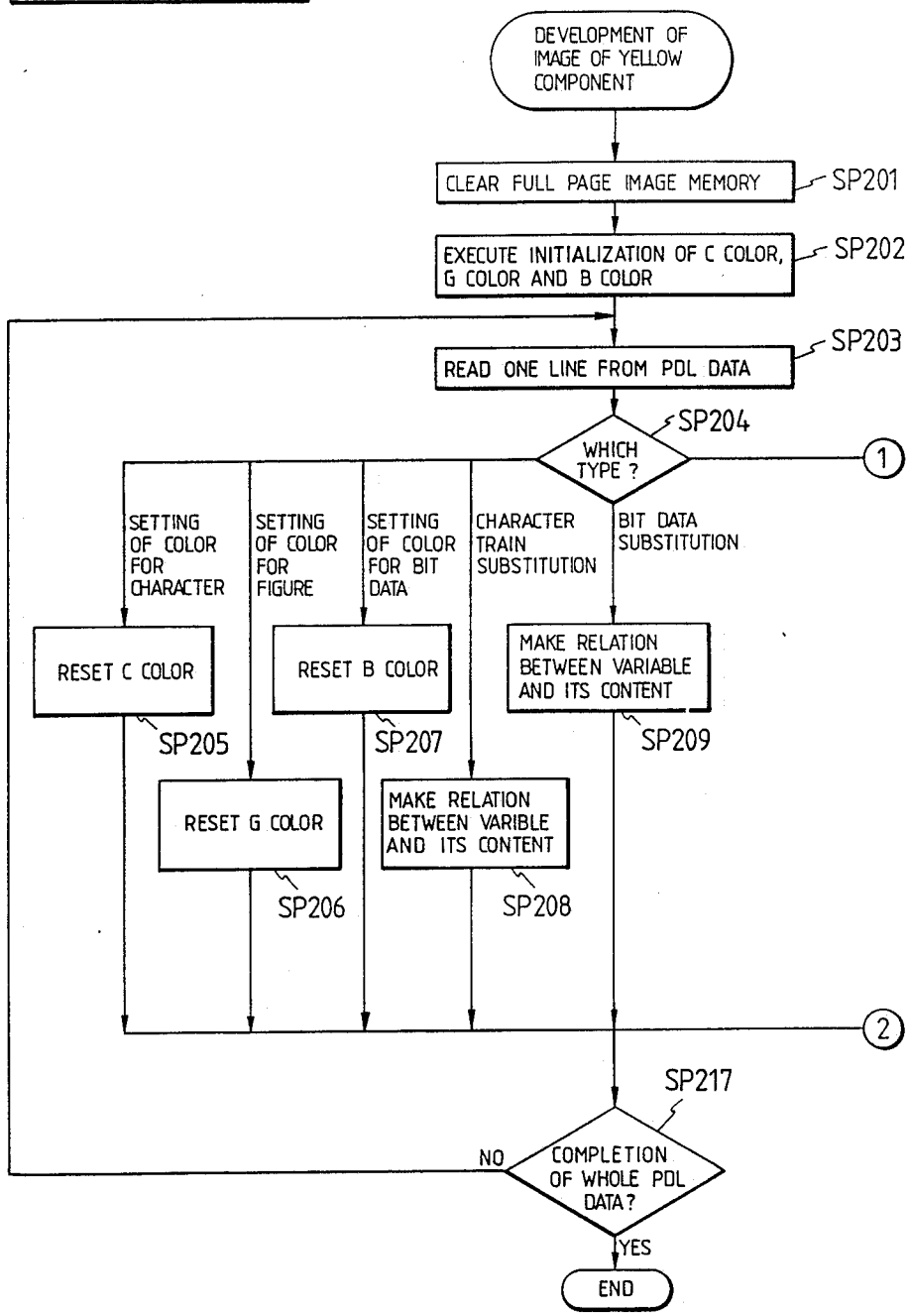
Figures 2, 12B:
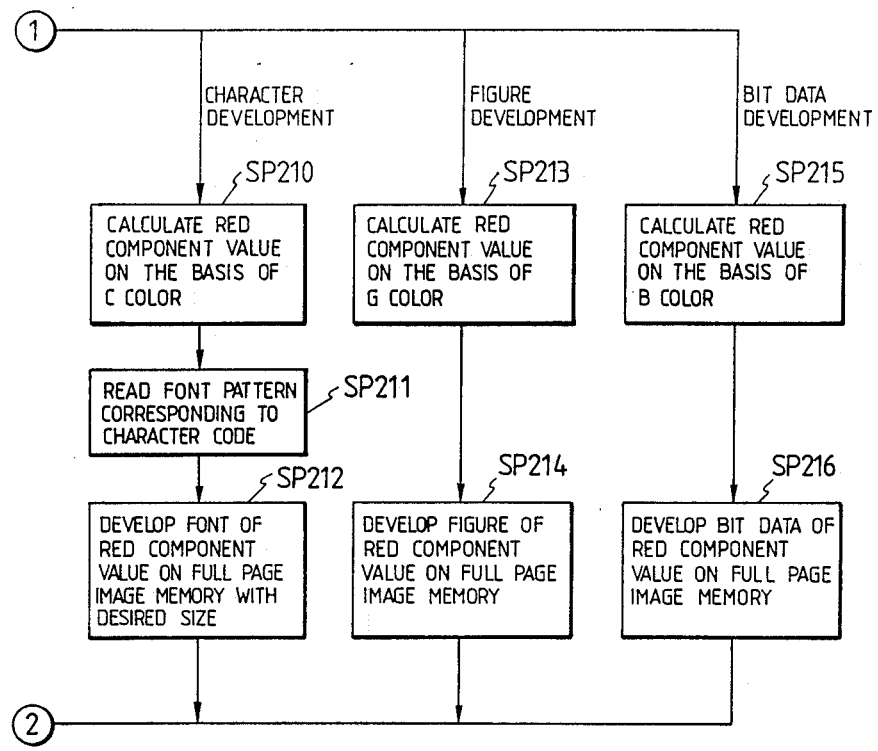

FIGS. 12A and 12B are diagrams for explaining the PDL (Page Description Language). The PDL is a general denomination of the language to describe at least one or more number of images by combining at least two of the image description A of character code, image description B of figure code, and image description C of bit data as shown in FIG. 5A. As the PDLS which are nowadays the main stream, PostScript (Adobe Systems), DDL (Imagen Hewlett Packard), and Interpress (XEROX) have been known.

In the description of the embodiment, the foregoing simple PDL shown in FIGS. 5B to 5D is used.

The control by the CPU 205 will now be described.

FIGS. 12A and 12B are flowcharts for explaining the control by the CPU 205. First, in step SP101, a check is made to see if a command has been sent from the outer host apparatus or not. If YES, the content of the command is checked in step SP102. In the case of the status requirement command, the status is returned to the host apparatus in step SP103 and the processing routine is returned to step SP101. In the case of the PDL data transfer command, in steps SP105 to SP113, the PDL data is received and an image is formed on the basis of the PDL data and the processing routine is then returned to step SP101. In the case of the other commands, the processing corresponding to each command is executed in step SP104. The processing routine is then returned to step SP101. In the case of the PDL data transfer command, the PDL data is first received from the outer host apparatus in step SP105 and stored into the PDL data memory. Although the PDL data transfer can be also performed by the CPU 5, it is executed by the DMA transfer by the DMAC in the embodiment as mentioned above.

In the next step SP106, the PDL data in the PDL data memory is interpreted and the image indicated by the PDL data is developed into the full page image memory 204-1 with respect to the red component.

Similarly, in steps SP107 and SP108, the images regarding the green and blue components are developed in the full page image memories 204-2 and 204-3, respectively.

In step SP109, the accessing mode to the memories 204-1 to 204-3 is switched to the address generating unit side. The yellow image signal is calculated by the image processing circuit 233 from the R, G, and B components read out, thereby forming a yellow image. In steps SP110 to SP112, the magenta, cyan, and black images are likewise formed. In step SP111, the respective color component toners on the paper are fixed and the paper is discharged to the outside of the apparatus. In the next step SP114, a check is made to see if the color image formation has been completed by only the set number of sheets in steps SP109 to SP113 or not. If NO, the processing routine is returned to step SP109.

On the contrary, if YES in step SP114, step SP101 follows and the processes of the image development and image formation are finished.

Since step SP106 in FIG. 7A is described in FIG. 12B, but it is similar to that in the flowchart of FIG. 6B, its description is omitted.

The red component of the input PDL data can be developed in the full page image memory 204-1 in accordance with the control flow shown in FIG. 12B.

In a manner similar to the above, in steps SP107 and SP108 in FIG. 12A, the green and blue component images of the input PDL data can be developed in the full page image memories 204-2 and 204-3, respectively.

FIG. 12B shows a control flowchart in the case where the red component image of the input PDL data is developed into the full page image memory. Since the content of the processes in FIG. 12B is substantially similar to that in FIG. 6B, its detailed description is omitted here. In FIG. 12B, "yellow component" in steps SP210 and SP212 to SP216 in FIG. 6B is replaced to "red component".

In the foregoing embodiment, the memories 204-1 to 204-3 have been used as the image memory means and the bit map memories whose resolutions are equal to that of the image forming apparatus have been used. However, the enlarging processing can be also executed at the time of image formation by using frame memories whose resolutions are smaller than that of the image forming apparatus. On the other hand, the CPU 5 to execute the processes in steps SP106 to SP108 in FIG. 12A has been used as the image developing means in the invention and the image processing circuit 233 has been used as the processing means in the invention.

As described above, according to the embodiment, the PDL data is image developed into each of the image memory means in correspondence to the peculiar input color components of the input PDL data, a set of input color component data in each of the image memory means are image processed, a set of output color component data are calculated, and an image is formed by those data. Therefore, the optimum image can be formed in the image forming apparatus such as a color printer or the like. Further, even in different image forming apparatuses, the image memory means and image developing means can be commonly used and it is sufficient to merely change the construction after the processing means. There are advantages such that the development costs can be reduced, the parts can be commonly used, and the like.

As described above, according to the third embodiment of the invention, a color image can be preferably formed.

The fourth embodiment of the invention will now be described. In the fourth embodiment, there is disclosed an image forming apparatus comprising:

input means for inputting at least one of coded character information, coded figure information, and bit image information;

image memory means for storing a color image which is expressed by a color number;

means for converting the color information of the image indicated by such information into the color number;

image developing means for developing the image indicated by each of those information into the image memory means by the color number converted by the converting means; and image forming means for forming output color component images in accordance with the color number value developed by the image developing means, wherein a color image is formed by executing the image conversion and the image formation with respect to a plurality of output color components.

The fourth embodiment will now be described with reference to FIG. 13. Since the mechanical construction of the apparatus is similar to FIG. 2, its description is omitted.

Figure 13:
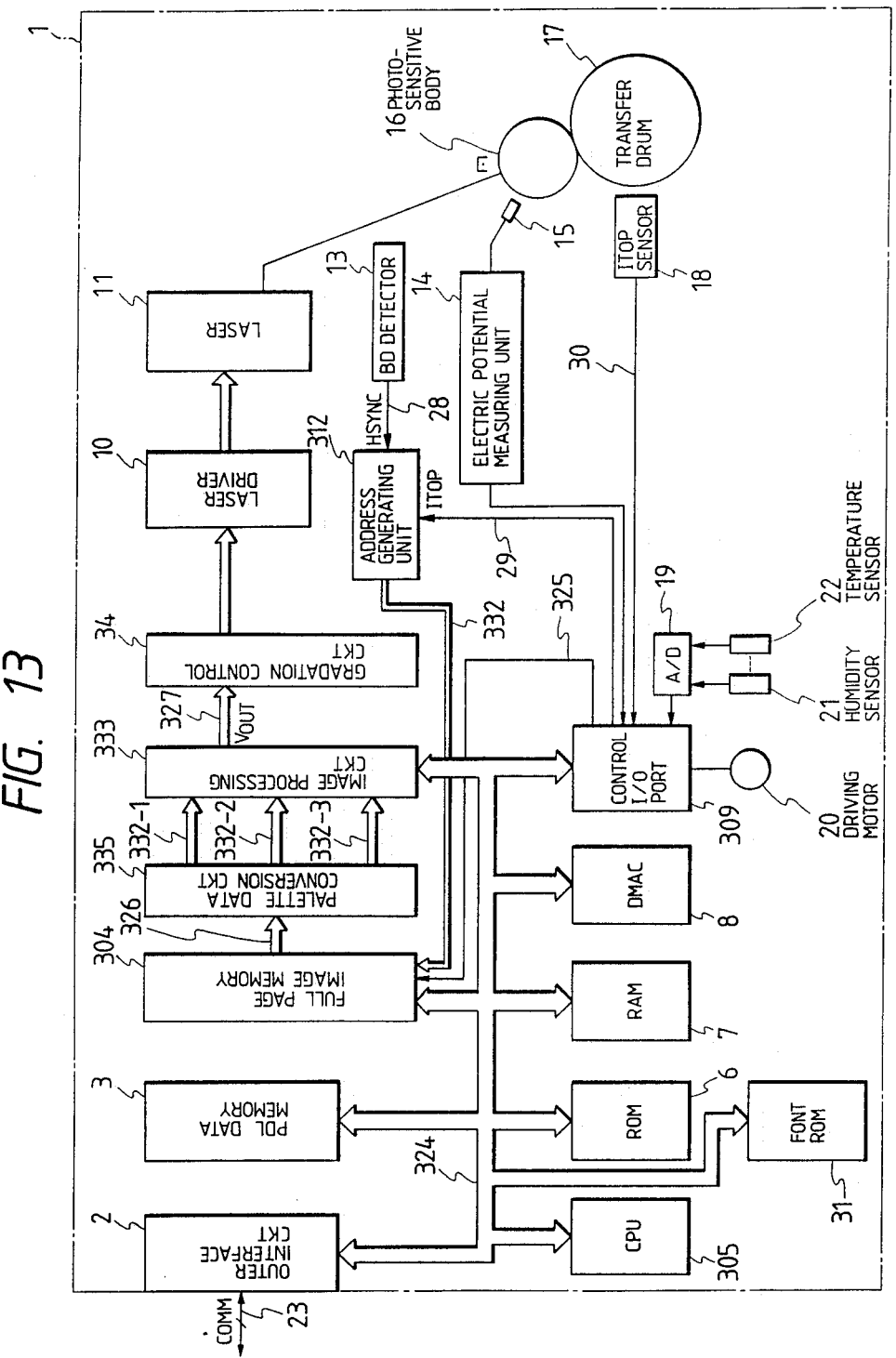
FIG. 13 is a block diagram of a color printer in the third embodiment of the invention.

In FIG. 13, reference numeral 324 denotes a CPU bus including the address bus and data bus. A CPU (Central Processing Unit) 305, the ROM (Read Only Memory) 6, RAM (Random Access Memory) 7, DMAC (Direct Memory Access Controller) 8, a control I/O port 309, font ROM 31, PDL data memory 3, and a full page image memory 304 are connected to the CPU bus 324, thereby enabling the data transfer among them and the control by the CPU 305 to be executed.

In the embodiment, the CPU 305 makes the DMAC 8 operative, thereby allowing the PDL data which is subsequently transferred through the outer interface circuit 2 to be DMA (Direct Memory Access) transferred to the PDL data memory 3. The DMA transfer is a data transferring method which is used in the general microcomputer system. After completion of the transfer of all of the PDL data, the CPU 305 first clears the full page image memory 304. The clearing operation of the memory in this case denotes that a value such as not to form an image at the time of image formation, which will be explained hereinlater, is written into the memory. In the case of the embodiment, the memory is cleared by writing such a value by the CPU 305. However, such a value can be also written by hardware like a simple circuit consisting of a clock generator and a counter. The full page image memory 304 is what is called a bit map memory and a palette data value can be set every pixel. The palette data value is data indicative of the color number. Each palette data value corresponds to a special color. For instance, when the palette data value as shown in FIG. 14 is 0, it corresponds to white. The palette data value of 1 corresponds to yellow. The palette data value of 2 corresponds to magenta. Such a corresponding relation differs in dependence on the color printer. Even in the case of one color printer, the relation can be varied by a command or the like from the host apparatus. In the color printer of this embodiment, there are relations as shown in a table of FIG. 14 between the palette data values and the colors indicated by them. In the table, the R. G. and B component data show the colors indicated by the palette data values which are expressed by the luminance values of R, G, and B in the NTSC system.

After the memory was cleared, the CPU interprets the PDL data held in the PDL data memory and develops the image indicated by the PDL data into the full page image memory. At this time, the image is written into the memory by the palette data corresponding to the color which is closest to the color information indicated by the PDL data. The developing method will be described hereinbelow. For the full page image memory 304, both of the writing and reading accesses of data by the CPU bus and the reading access by the address which is generated by an address generating unit 312 can be performed. The accessing modes can be switched by a control signal 325 from the control I/O port 309. The foregoing image development is executed by switching the accessing mode to the accessing side by the CPU bus. After completion of the development into the full page image memory, the CPU 305 switches the accessing mode to the full page image memory to the address generating unit side. Palette data 326 read out of the full page image memory in accordance with the address generated from the address generating unit is input to a palette data conversion circuit 335 and converted into component data 332-1, 332-2, and 332-3 of R, G, and B. The R, G, and B component data are input to an image processing circuit 333 and one output color component data is calculated, so that an image forming signal $V_{OUT}$ 327 is output. The reading operation of the palette data from the full page image memory, conversion of the palette data into the R, G and B component data, and calculation of the image forming signal are executed every image formation of four times, which will be explained hereinlater. The yellow, magenta, cyan, or black component image is output as the image forming signal $V_{OUT}$ 327 every image formation. An output of the image processing circuit 333 is input to a gradation control circuit 34 and gradation corrected by an LUT (Look-Up Table) or the like so as to correspond to the color reproduction concentration of the printer. The gradation corrected data is input to the laser driver 10 and the laser 11 is driven, thereby forming an image.

The CPU 305 repeats the processes such that the red, green, and blue component image data developed in the full page image memory are image processed and one output color component data is calculated, thereby forming an image with respect to each of the yellow, magenta, cyan, and black output color components, thereby forming a full color image.

For instance, when considering the first image formation in which the yellow component signal is output from the full page image memory 304, the dot image of the yellow component of an original is first exposed onto the photosensitive drum 91 and developed by the developing device 92 of yellow.

Next, for the yellow image, the toner image of yellow is transferred and formed by the transfer charging device 98 onto a paper wound on the transfer drum 96 at the contact between the photosensitive drum 91 and the transfer drum 96. By the same processes as mentioned above, the magenta, cyan, and black toner images are repetitively transferred and formed in the second to fourth image formation in accordance with the magenta, cyan, and black component signals which are output from the full page image memory 304, respectively. A color image is formed by four color toners by overlaying the respective color images onto a paper.

Since the address generating unit 312 in FIG. 13 is similar to that described in FIG. 3, its detailed description is omitted.

FIG. 14 shows a correspondence table of the palette data 326 as an input of the palette data conversion circuit 335 and the R, G, and B component image data 332-1, 332-2, and 332-3 as outputs of the circuit 335. In this embodiment, the palette data is expressed by eight bits and has values of 0 to 255. On the other hand, each of the color component data is also expressed by eight bits and has values of 0 to 255. The palette data conversion circuit 335 can be easily constructed by LUTs (Look-Up Tables) which use the palette data as an address and hold each of the color component data in the corresponding address.

For instance, with regard to the palette data 0, the value 255 is written into address 0 in the LUT for the R component data, the value 255 is written into address 0 in the LUT for G component data, and the value 255 is written into address 0 in the LUT for B component data.

Since the construction of the image processing circuit 333 is similar to that shown in FIG. 10, its description is omitted.

Figure 15B:
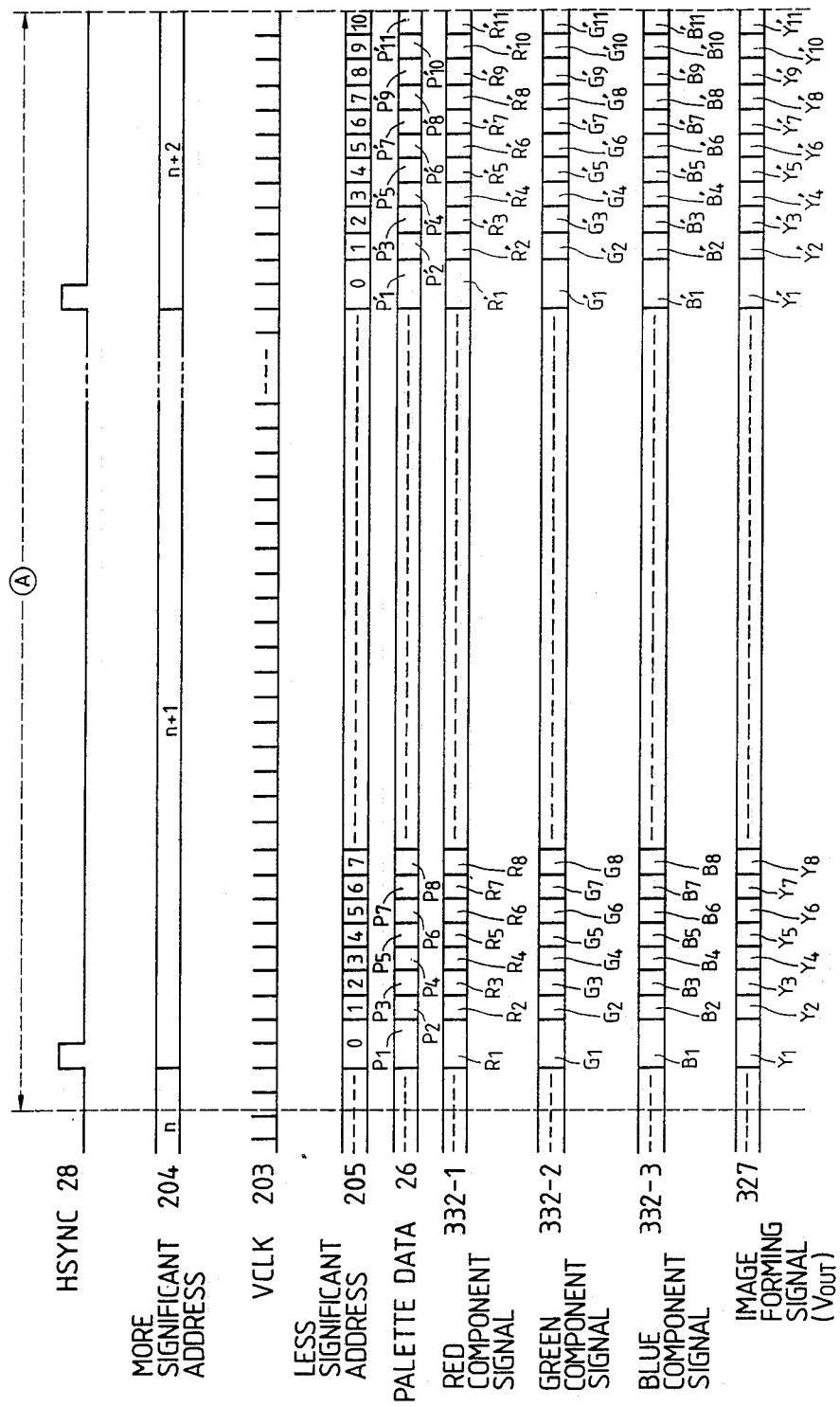

FIG. 15A is a timing chart for the vertical sync signal (ITOP) 29 and horizontal sync signal (HSYNC) 28 which are input to the address generating unit when the image formation of four times is executed, the more significant address 204 in the full page image memory 304 which is generated from the address generating unit, palette data 326 which is read out of the full page image memory on the basis of the more significant address, color component signals 332-1, 332-2, and 332-3 of R, G, and B which are formed by the palette data conversion circuit 335 from the palette data, and image forming signal $V_{OUT}$ 327 which is formed by the image processing circuit 333 from those signals. As shown in the diagram, subsequent to each of the vertical sync signals, the yellow, magenta, cyan, and black component data are made and sent to the laser driver 10. In the diagram, although the more significant address has been illustrated so as to be continuously changed in order to enable the address to be easily seen. However, since the more significant address is actually the output value of the counter which receives the HSYNC signal, it has a stairway shape synchronized with the HSYNC. FIG. 15B shows a timing chart for each signal in the interval of (A) in FIG. 15A. The timing chart relates to the interval from one horizontal sync signal (HSYNC) 28 to the next horizontal sync signal and shows the timing for each signal in one horizontal interval. The more significant address 204 is counted up one by every HSYNC. The less significant address 205 is reset to 0 by the HSYNC and is counted up one by one by the image carrier clock 203. The data in the address which is designated by the less significant address 205 and more significant address 204 in the full page image memory 304 is read out and becomes the palette data 326. Therefore, $P_1$ to $P_8$ in FIG. 15B denote the data in the more significant address n+1 and less significant addresses 0 to 7, and $P_1'$ to $P_8'$ indicate the data in the more significant address n+2 and less significant addresses 0 to 7, respectively. That is, $P_1$ to $P_8$ represent the image data at the positions which are deviated by only one address in the vertical direction for $P_1'$ to $P_8'$. The same shall also apply to $R_1$ to $R_8$ and $R_1'$ to $R_8'$, $G_1$ to $G_8$ and $G_1'$ to $G_8'$, and $B_1$ to $B_8$ and $B_1'$ to $B_8'$ which are calculated from the palette data. The same shall also apply to the image forming signals $Y_1$ to $Y_8$ which are finally calculated. In this manner, $R_1$ to $R_8$, $G_1$ to $G_8$, $B_1$ to $B_8$, and $Y_1$ to $Y_8$ correspond to $P_1$ to $P_8$. The palette data 326 is processed by the palette data conversion circuit and becomes the color component signals 326-1, 326-2, and 326-3. The color component signals are further processed by the image processing circuit 333 and becomes the image forming signal 327. Thus, a time delay occurs between the color component signals and the image forming signal. However, the time delay difference is set to 0 for simplicity of explanation in FIG. 15.

The operation of the CPU 305 will now be described with reference to FIGS. 16A and 16B.

Figure 16A:
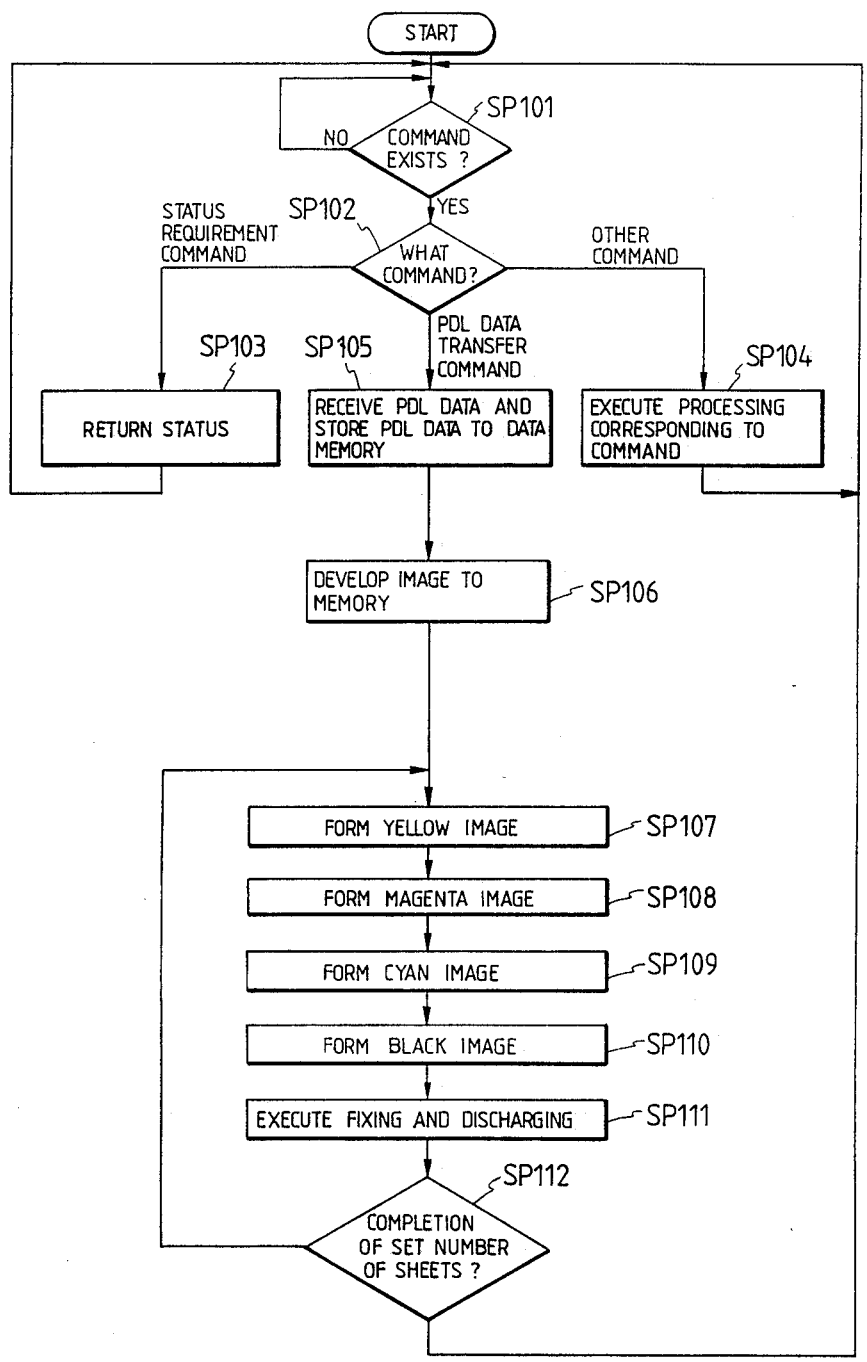
FIGS. 16A and 16B (consisting of FIGS. 16B-1 and 16B-2)--; are control flowcharts.
Figures 2, 16B:
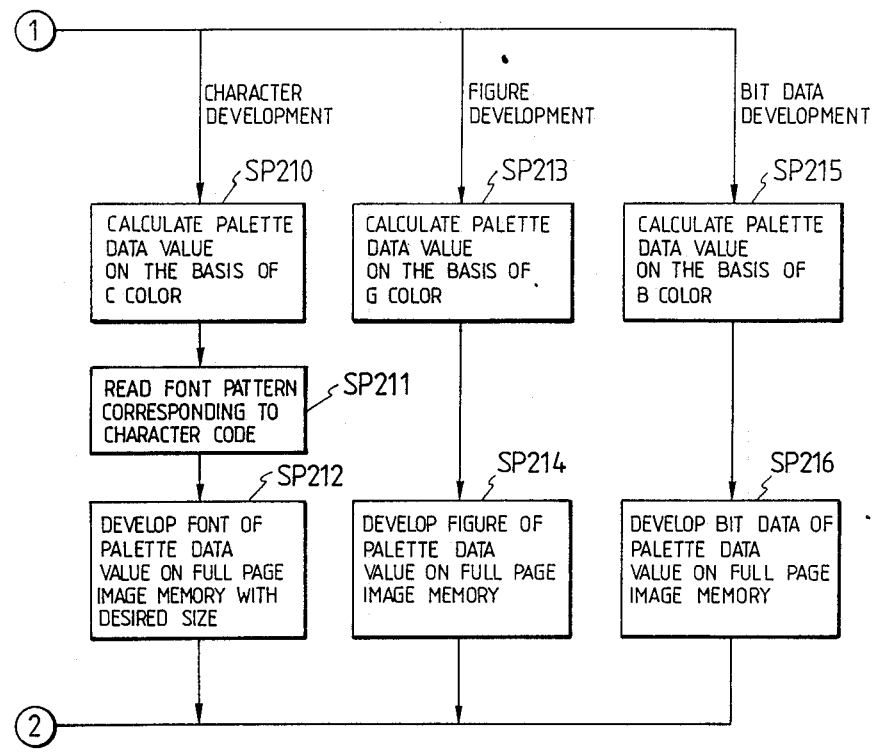

FIGS. 16A and 16B are flowcharts for explaining the control by the CPU 305. First, in step SP101, a check is made to see if a command has been sent from the outer host apparatus or not. If YES, the content of the command is checked in step SP102. In the case of the status requirement command, the status is returned to the host apparatus in step SP103 and the processing routine is returned to step SP101. In the case of the PDL data transfer command, in steps SP105 to SP113, the PDL data is received and an image is formed on the basis of the PDL data and the processing routine is returned to step SP101. In the case of the other commands, the processing corresponding to the command is executed in step SP104 and the processing routine is returned to step SP101. In the case of the PDL data transfer command, the PDL data is first received from the outer host apparatus in step SP105 and stored into the PDL data memory. Although the PDL data transfer can also be performed by the CPU 305, such a data transfer is executed by the DMA transfer due to the DMAC in this embodiment as mentioned above.

In the next step SP106, the PDL data in the PDL data memory is interpreted and the image indicated by the PDL data is developed in the full page image memory 304.

In step SP107, the accessing mode to the full page image memory 304 is switched to the address generating unit side. The palette data read out is converted into the color component data of R, G, and B. Further, the yellow image signal is calculated by the image processing circuit 333 from the color component data, thereby forming the yellow image. In steps SP108 to SP110, the magenta, cyan, and black images are similarly formed. In step SP111, the color component toners on a paper are fixed and the paper is discharged to the outside of the apparatus. In step SP112, a check is made to see if the color image formation of only the set number of sheets in steps SP107 to SP111 has been executed or not. If NO, the processing routine is returned to step SP107.

On the contrary, if YES in step SP112, the processing routine is returned to step SP101 and the processes of the image development and image formation are finished.

Step SP106 in FIG. 16A will now be described in detail in accordance with the flowchart of FIG. 16B.

In step SP201, the full page image memory is cleared so as not to form an image in the portions other than the subsequently image developed portion. Practically speaking, in step SP202 to write the palette data 0 (white) to the whole area, a variable "ccolor" indicative of the color for character, a variable "gcolor" representative of the color for figure, and a variable "bcolor" indicative of the color for bit data are initialized. The variables are expressed by a set of three luminance data of red (R), green (G), and blue (B).

In the next steps SP203 to SP216, the PDL data of one line is developed and such a development is repeated for the PDL data of all of the lines in the PDL data memory. In step SP217, a check is made to see if the development of the PDL data of all of the lines has been completely executed or not.

First, in step SP203, the data of one line is read out of the PDL data memory. In step SP204, the type of PDL data read out is checked.

When setting the color for character (15b-1 in the example of FIG. 5B), "ccolor" is reset in step SP205. When setting the color for graphic (15c-1 in the example of FIG. 5C), "gcolor" is reset in step SP206. When setting the color for bit data (15d-1 in the example of FIG. 5D), "bcolor" is reset in step SP207. When setting the substitution of character train (15b-2 in the example of FIG. 5B), the relation between the variable and its content is made by a table or the like set in the working RAM 7 in step SP208. When setting the substitution of bit data (15d-2 in the example of FIG. 5D), the relation between the variable and its content is also similarly made in step SP209.

In the case of the character development (15b-3 in the example of FIG. 5B), the palette data value $P_{OUT}$ is first calculated from "ccolor" in step $SP_{210}$. Assuming that the red, green, and blue component values of "ccolor" are set to $R1_{in}$, $G_{in}$, and $B_{in}$ ($0 < R_{in} < 1$, $0 < G_{in} < 1$, $0 < B_{in} < 1$), the CPU 305 searches the table in the ROM 6 which expresses the relation between the palette data and each color component data shown in FIG. 14 and finds out the palette data corresponding to the set which is nearest to the set of $R_{in}$, $G_{in}$, and $B_{in}$ mentioned above. Such a table can be also made in the RAM 7. In such a case, the table can be rewritten by the CPU 305.

In the above searching operation, the distances shown below are successively calculated with respect to each palette data $P_i$ and the palette data of the smallest distance value is searched. $R_i$, $G_i$, and $B_i$ denote color component data corresponding to the palette data $P_i$.

$$dl = |R_i - 255 \times R_{in}|^2 + |G_i - 255 \times B_{in}|^2 + |B_i - 255 \times B_{in}|^2$$

In addition to the above method, it is also possible to provide a certain kind of regularity for the arrangement of palette data and to set the palette data values to the function of $R_{in}$, $G_{in}$, and $B_{in}$.

For instance, assuming that $$P_i = (R_{in} \% 0.13) \times 32 + (G_{in} \% 0.13) \times 4 + (B_{in} \% 0.26)$$

(where, % is a function to obtain an integer quotient) each value of $R_{in}$, $G_{in}$, and $B_{in}$ is 0 or more or less. Therefore, ($R_{in} \% 0.13$) and ($G_{in} \% 0.13$) have values within a range from 0 to 7 and ($B_{in} \% 0.26$) has a value within a range from 0 to 3. Thus, $P_i$ has the value within a range from 0 to 255 ($7 \times 32 + 7 \times 4 + 3$).

In step SP211, a font pattern corresponding to the character code is read out of the font ROM 31. The font pattern is developed in the full page image memory 304 in step SP212. At this time, $P_{OUT}$ is used as data to be written. Although the data is enlarged or reduced into the size indicated, since such a process can be easily realized by software, its description is omitted.

In the case of the figure development (15c-2 in the example of FIG. 5C). in step SP213, the palette data value $P_{OUT}$ is first calculated from "gcolor" in a manner similar to step $SP_{210}$. A figure is written in the memory 304 by using the palette data value $P_{OUT}$ in step $SP_{214}$. Since the algorithm to draw an indicated figure such as a line, circle, or ellipse by software is generally known, its description is omitted.

In the case of the bit image development (15d-7 in the example of FIG. 5D), in step SP215, the palette data value $P_{OUT}$ is first calculated from "bcolor" in a manner similar to step SP210. Bit data is written into the memory 304 by using the palette data value $P_{OUT}$ in step SP216.

In the case of the image development in steps SP212, SP214, and SP216, the address in which the coordinate value in the horizontal direction is set to the less significant address and the coordinate value in the vertical direction is set to the more significant address is calculated as mentioned above.

In this manner, an image indicated by the input PDL data can be developed into the full page image memory 304 in accordance with the control flow shown in FIG. 16B.

In this embodiment, the CPU 305 to execute the conversion into the color number as shown in FIG. 14 has been used as the means for converting the color information into the color number.

In this embodiment, the full page image memory 304 has been used as image memory means and the bit map memory whose resolution is equal to that of the image forming apparatus has been used. However, the enlarging processing can be also performed upon image formation by using a frame memory whose resolution is smaller than that of the image forming apparatus. On the other hand, although the CPU 305 to execute step SP106 in FIG. 16A, namely, the flow of FIG. 16B has been used as image developing means of the invention, such a flow can be executed by hardware as mentioned above.

As described above, according to this embodiment, the color information of the input PDL data is converted into the color number which is peculiar to the printer, an image is developed into the frame memory by the color number, and upon image formation, the color number read out of the frame memory is converted into the output color component data which is peculiar to the printer, and an image is formed on the basis of the output color component data. Therefore, a color printer can be constructed by a memory of a small number of bits.

In the first to fourth embodiments of the present invention, the image development has been all performed by software. However, a part of the software such as development of the font can be also replaced by hardware.

Further, in these embodiments, although the electrophotographic color printer has been used as image forming means, it is also possible to use a color printer of the thermal copy transfer type, silver salt type, electrostatic type, or the like. A color printer of what is called a 4D type having drums for latent images for every forming color can be also used.

Further, in these embodiments, the general interface (interface circuit shown in FIG. 1) such as GPIB, RS232C, or the like has been used as input means. However, for instance, a CPU bus such as a VME bus can be also used as the input means. An off-line medium such as magnetic tape, magnetic disk, or the like may be also used. Moreover, an LAN such as Ethernet or the like can be also used.

Although the present invention has been described with respect to the preferred embodiments, the invention is not limited to the foregoing embodiments but many modifications and variations are possible within the spirit and scope of the appended claims of the invention.

What is claimed is:

1. A color image forming apparatus comprising:
    (a) input means for inputting coded character or figure information;
    (b) image forming means for forming a color image by using a plurality of output color components;
    (c) converting means for converting said coded information input by said input means into an image pattern and for writing the image pattern into image memories of a number which is smaller than the number of said plurality of output color components; and
    (d) control means for allowing the operation of said converting means to be repeated so as to convert said plurality of output color components into image patterns and write the image patterns into said image memories.

2. An apparatus according to claim 1, wherein said image memories have a capacity as much as a capacity corresponding to a predetermined area for one of the output color components.

3. An apparatus according to claim 1, wherein said output color components are at least three in number and said image memories have a capacity as much as a capacity corresponding to a predetermined area for two of said output color components.

4. An apparatus according to claim 3, wherein said output color components include yellow (Y), magenta (M), and cyan (C).

5. An apparatus according to claim 1, wherein said input means inputs coded information represented by a page description language.

6. An apparatus according to claim 1, wherein said image forming means area sequentially forms images of said plurality of output color components.

7. An apparatus according to claim 1, further comprising:
    (e) a second memory to store the coded information input by said input means.

8. An apparatus according to claim 6, wherein said image forming means is image forming means using an electrophotographic system.

9. A color image forming apparatus comprising:
    (a) input means for inputting coded color character or figure information;
    (b) image forming means for forming a color image by using a plurality of output color components;
    (c) an image memory into which image patterns converted from input color components in the coded information input by said input means are written, said memory consisting of image memories of a number corresponding to the number of said input color components; and
    (d) processing means for outputting output color components of said image forming means from a plurality of image patterns stored in said image memories.

10. An apparatus according to claim 9, wherein said input color component are at least three in number.

11. An apparatus according to claim 10, wherein said input color components are three primary color components.

12. An apparatus according to claim 9, wherein said processing means is color masking processing means.

13. An apparatus according to claim 9, wherein said output color components include yellow (Y), magenta (M), and cyan (C).

14. An apparatus according to claim 9, further comprising:
   converting means for converting the coded information input by said input means into image patterns and for writing the image patterns into said image memory for every said input color component.

15. An apparatus according to claim 13, wherein said output color components further include black (BK).

16. An apparatus according to claim 9, wherein said input means inputs coded information represented by a page description language.

17. An apparatus according to claim 9, wherein said image forming means plane sequentially forms images of said plurality of output color components.

18. An apparatus according to claim 9, further comprising:
   (e) a second memory to store the coded information input by said input means.

19. An apparatus according to claim 17, wherein said image forming means is image forming means using an electrophotographic system.

20. A color image forming apparatus comprising:
   a) input means for inputting coded color character or figure information;
   b) image forming means for forming a color image by using a plurality of output color components;
   c) an image memory into which an image pattern converted from the coded information input by said input means is written, said image memory storing color information in said coded information as a color number; and
   d) supply means for converting the color number stored in said image memory into a respective said output color component and for supplying said respective output color component to said image forming means.

21. An apparatus according to claim 20, wherein said color number has a predetermined number of kinds.

22. An apparatus according to claim 21, further comprising:
   e) converting means for converting said color information into said color number.

23. An apparatus according to claim 22, wherein said converting means is means for selecting the color number which is nearest to said color information from among said predetermined number of kinds of color numbers and for outputting.

24. An apparatus according to claim 20, wherein said output color components include yellow (Y), magenta (M), and cyan (C).

25. An apparatus according to claim 20, wherein said input means inputs coded information represented by a page description language.

26. An apparatus according to claim 20, wherein said image forming means plane sequentially forms images of said plurality of output color components.

27. An apparatus according to claim 20, further comprising:
   (e) a memory to store the coded information input by said input means.

28. An apparatus according to claim 26, wherein said image forming means is image forming means using an electrophotographic system.

29. A color image forming apparatus comprising:
   (a) input means for inputting coded color character or figure information;
   (b) image forming means for plane sequentially forming images of a plurality of output color components constructing a color image;
   (c) an image memory into which an image pattern converted from the coded information input by said input means is written, said image memory having a capacity as much as capacity corresponding to a predetermined area for one of said plurality of output color components; and
   (d) control means for allowing the coded information input by said input means to be converted into the image pattern and written into said image memory, said control means converting said plurality of output color components one by one into said image memory synchronously with the plane sequential image formation by said image forming means.

30. An apparatus according to claim 29, wherein said output color components include yellow (Y), magenta (M), and cyan (C).

31. An apparatus according to claim 29, wherein said input means inputs coded information represented by a page description language.

32. An apparatus according to claim 29, wherein said image forming means area sequentially forms images of said plurality of output color components.

33. An apparatus according to claim 29, further comprising:
   (e) a second memory to store the coded information input by said input means.

34. An apparatus according to claim 29, wherein said image forming means is image forming means using an electrophotographic system.

* * * * *

UNITED STATES PATENT AND TRADEMARK OFFICE
CERTIFICATE OF CORRECTION

PATENT NO.  : 4,963,898

DATED       : October 16, 1990

INVENTOR(S) : TOSHIHIRO KADOWAKI, ET AL.

It is certified that error appears in the above-identified patent and that said Letters Patent is hereby corrected as shown below:

In the Drawings:

SHEET 6 OF 26

FIG. 6A, "FROM" should read --FORM-- (all occurrences).

SHEET 7 of 26

FIG. 6B-1, "VARIBLE" should read --VARIABLE--.

SHEET 12 OF 26

FIG. 8B, "FROM" should read --FORM-- (all occurrences).

SHEET 14 OF 26

FIG. 10, "CPU BUS 24" should read --CPU BUS 324--.

SHEET 18 OF 26

FIG. 12B-1, "VARIBLE" should read --VARIABLE--.

SHEET 22 OF 26

FIG. 15A, "PALATTE" should read --PALETTE--.

SHEET 25 OF 26

FIG. 16B-1, "VARIBLE" should read --VARIABLE--.

UNITED STATES PATENT AND TRADEMARK OFFICE
CERTIFICATE OF CORRECTION

PATENT NO. : 4,963,898
DATED : October 16, 1990
INVENTOR(S) : TOSHIHIRO KADOWAKI, ET AL.

It is certified that error appears in the above-identified patent and that said Letters Patent is hereby corrected as shown below:

COLUMN 1

Line 12, "the" should be deleted.
    Line 29, "data are" should read --data which are--.

COLUMN 2

Line 68, "and image" should read --and ¶ image--.

COLUMN 3

Line 7, "embodiment--;" should read --embodiment--.
    Line 21, "6B-2)--;" should read --6B-2)--.
    Line 24, "8A-2)--." should read --8A-2)--.
    Line 33, "12B-2)--;" should read --12B-2)--.
    Line 37, "pallet" should read --palette--.
    Line 41, "16B-2)--;" should read --16B-2)--.
    Line 57, "drawings. Embodiment 1--. should read --drawings. ¶ Embodiment 1--.

COLUMN 6

Line 56, "this" should read --the-- and "the" (first occurrence) should read --this--.

COLUMN 7

Line 43, "(Con-" should be deleted.
    Line 44, "trol" should read --(Control--.

UNITED STATES PATENT AND TRADEMARK OFFICE
CERTIFICATE OF CORRECTION

PATENT NO. : 4,963,898

DATED : October 16, 1990

INVENTOR(S) : TOSHIHIRO KADOWAKI, ET AL.

It is certified that error appears in the above-identified patent and that said Letters Patent is hereby corrected as shown below:

COLUMN 8

Lines 56-59, "$D_{C'} = LG(D_R) 0 \leq D_R < 10 \leq D_{C'} \leq 1$
$D_{M'} = LG(D_G) 0 \leq D_G \leq 10 \leq D_{M'} \leq 1$
$D_{Y'} = LG(D_B) 0 \leq D_B \leq 10 \leq D_{Y'} \leq 1$"

should read

--$D_{C'} = LG(D_R) \quad 0 \leq D_R < 1 \quad 0 \leq D_{C'} \leq 1$
$D_{M'} = LG(D_G) \quad 0 \leq D_G \leq 1 \quad 0 \leq D_{M'} \leq 1$
$D_{Y'} = LG(D_B) \quad 0 \leq D_B \leq 1 \quad 0 \leq D_{Y'} \leq 1$--.

COLUMN 9

Line 31, "step $SP_{210}$," should read --step SP210,--.
Line 35, "step $SP_{211}$," should read --step SP211,--.
Line 37, "step $SP_{212}$." should read --step SP212.--.
Line 55, "steps $SP_{212}$," should read --steps SP212,--.
Line 56, "$SP_{214}$," should read --SP214,--.
Line 64, "$SP_{110}$," should read --SP110,--.
Line 66, "the" (first occurrence) should read --this--.

COLUMN 10

Line 29, "and ② the" should read --and ② the--.

COLUMN 11

Line 50, "this" should read --the-- and "the" (first occurrence) should read --this--.

UNITED STATES PATENT AND TRADEMARK OFFICE
CERTIFICATE OF CORRECTION

PATENT NO. : 4,963,898

DATED : October 16, 1990

INVENTOR(S) : TOSHIHIRO KADOWAKI, ET AL.

It is certified that error appears in the above-identified patent and that said Letters Patent is hereby corrected as shown below:

COLUMN 14

Line 55, "Y = cs - d" should read --Y = cx - d--.

COLUMN 15

Line 3, "$LG(U_R)$" should read --$LG(V_R)$--.
Line 11, "$ay_1$" should read --$aY_1$--.

COLUMN 16

Line 38, "PDLS" should read --PDLs--.

COLUMN 18

Line 50, "the" (second occurrence) should read --this--.

COLUMN 20

Line 54, "one" should be deleted.

COLUMN 21

Line 9, "becomes" should read --become--.

COLUMN 22

Line 27, "step $SP_{210}$." should read --step SP210.--.
Line 44, "$d1=|R_i-255 \times R_{in}|^2+|G_i-255 \times B_{in}|^2$" should read --$d1=|R_i-255 \times R_{in}|^2+|G_i-255 \times G_{in}|^2$--.

UNITED STATES PATENT AND TRADEMARK OFFICE
CERTIFICATE OF CORRECTION

PATENT NO. : 4,963,898
DATED : October 16, 1990
INVENTOR(S) : TOSHIHIRO KADOWAKI, ET AL.

It is certified that error appears in the above-identified patent and that said Letters Patent is hereby corrected as shown below:

COLUMN 22

Line 45, "$+|B_i-255 \times B_{in}\{^2$" should read $--+|B_i-255 \times B_{in}|^2--$.

COLUMN 23

Line 2, "step $SP_{210}$." should read --step SP210.--.
Line 3, "step $SP_{214}$." should read --step SP214.--.

COLUMN 24

Line 68, "component" should read --components--.

COLUMN 26

Line 28, "as capacity" should read --as a capacity--.

Signed and Sealed this

Eleventh Day of August, 1992

*Attest:*

DOUGLAS B. COMER

*Attesting Officer*   *Acting Commissioner of Patents and Trademarks*